(12) United States Patent
Hirabayashi et al.

(10) Patent No.: US 8,059,161 B2
(45) Date of Patent: Nov. 15, 2011

(54) IMAGE-INFORMATION RECORDING DEVICE AND IMAGE-INFORMATION DISPLAY DEVICE

(75) Inventors: Mitsuhiro Hirabayashi, Tokyo (JP); Fumitaka Kawate, Kanagawa (JP); Osamu Date, Saitama (JP); Hiroshi Jinno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1080 days.

(21) Appl. No.: 10/574,941

(22) PCT Filed: Aug. 24, 2005

(86) PCT No.: PCT/JP2005/015350
§ 371 (c)(1), (2), (4) Date: Feb. 12, 2007

(87) PCT Pub. No.: WO2006/025239
PCT Pub. Date: Mar. 9, 2006

(65) Prior Publication Data
US 2007/0165114 A1 Jul. 19, 2007

(30) Foreign Application Priority Data
Aug. 30, 2004 (JP) .............................. P2004-250577

(51) Int. Cl.
*H04N 5/228* (2006.01)
(52) U.S. Cl. ..................... 348/222.1; 386/332; 386/333; 386/337
(58) Field of Classification Search ............... 348/222.1; 386/332, 333, 337; 369/47.13, 53.2, 275.3; 360/48, 60
See application file for complete search history.

(56) References Cited

U.S. PATENT DOCUMENTS

| | | | |
|---|---|---|---|
| 6,377,518 B1 * | 4/2002 | Auwens et al. | 369/30.04 |
| 7,386,218 B2 * | 6/2008 | Temple et al. | 386/241 |
| 2002/0111940 A1 * | 8/2002 | Asai et al. | 707/1 |
| 2002/0186961 A1 | 12/2002 | Kikuchi et al. | |
| 2004/0027890 A1 * | 2/2004 | Nakanishi et al. | 365/202 |

(Continued)

FOREIGN PATENT DOCUMENTS

EP 1 486 979 A1 12/2004
(Continued)

OTHER PUBLICATIONS

Japanese Office Action issued Dec. 15, 2010 for corresponding Japanese Application No. 2004-250577.

(Continued)

*Primary Examiner* — Yogesh Aggarwal
(74) *Attorney, Agent, or Firm* — Rader, Fishman & Grauer PLLC

(57) ABSTRACT

To search image information regarding image data, recorded on a storage medium, based on a desired search condition and to perform efficient display.

An attribute-information obtaining section 221 obtains attributes. For respective chapters, the attributes are held by an attribute file 500. A condition searching section 223 searches the attributes for the respective chapters in accordance with a condition input from a condition inputting section 222. A thumbnail obtaining section 224 obtains thumbnails that match the search condition. An index displaying section 226 displays the obtained thumbnails. When a thumbnail is selected via an image selecting section 227, an image reproducing section 228 reproduces image data in accordance with link information extracted by a link-information extracting section 225.

16 Claims, 21 Drawing Sheets

U.S. PATENT DOCUMENTS

| | | |
|---|---|---|
| 2004/0047597 A1 | 3/2004 | Hirabayashi et al. |
| 2004/0172416 A1 | 9/2004 | Murakami et al. |
| 2005/0152688 A1* | 7/2005 | Chen et al. .................... 386/125 |
| 2005/0157599 A1 | 7/2005 | Kiyama et al. |

FOREIGN PATENT DOCUMENTS

| | | |
|---|---|---|
| EP | 1 496 701 A1 | 1/2005 |
| JP | 2000-082276 | 3/2000 |
| JP | 2000-155998 | 6/2000 |
| JP | 2001-326910 | 11/2001 |
| JP | 2001-326910 A | 11/2001 |
| JP | 2003-050811 A | 2/2003 |
| JP | 2003-153140 | 5/2003 |
| JP | 2004-201170 A | 7/2004 |
| WO | WO 03/079359 | 9/2003 |
| WO | WO-03/079359 A1 | 9/2003 |
| WO | WO-03/088665 A1 | 10/2003 |

OTHER PUBLICATIONS

Extended European Search Report issued Nov. 4, 2009 for corresponding European Application No. 05 77 4564.

Australian Patent Office; Application No. SG 200602799-9; Dated: Aug. 24, 2005.

Notification of Transmittal of Translation of the International Preliminary Report on Patentability (Form: PCT/IB/338, PCT/IB/373, and PCT/ISA/237).

Japanese Office Action issued Jan. 20, 2009 for corresponding Japanese Application No. 2004-250577.

International Search Report mailed Dec. 13, 2005.

International Written Opinion mailed Dec. 13 2005.

Notification of Transmittal of Translation of the International Preliminary Report on Patentability (Form: PCT/IB/338, PCT/IB/373, and PCT/ISA/237); Dated Mar. 8, 2007.

* cited by examiner

FIG. 14
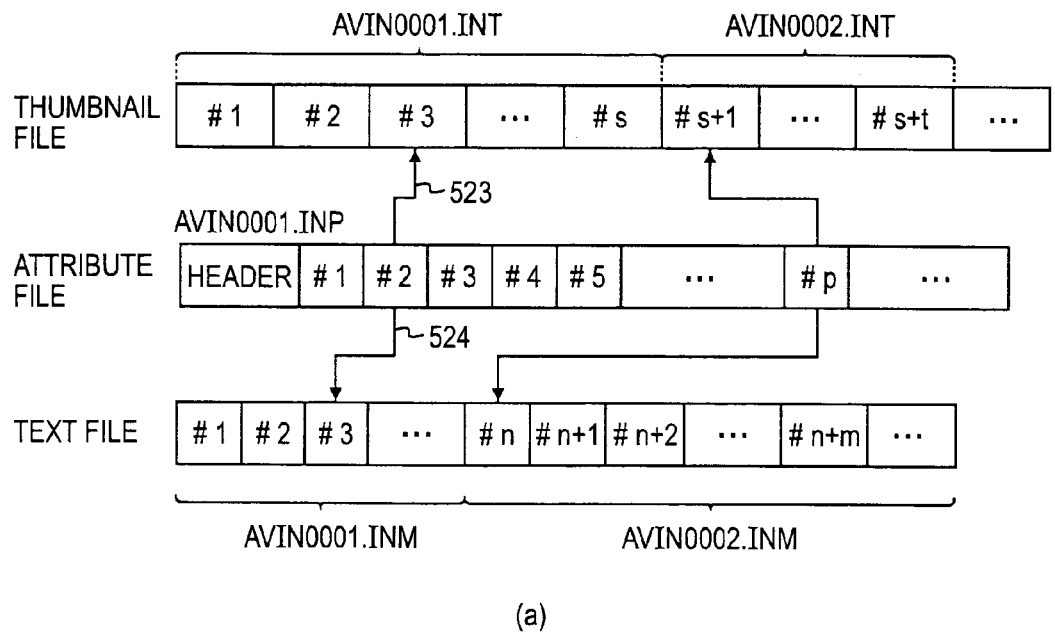
(a)
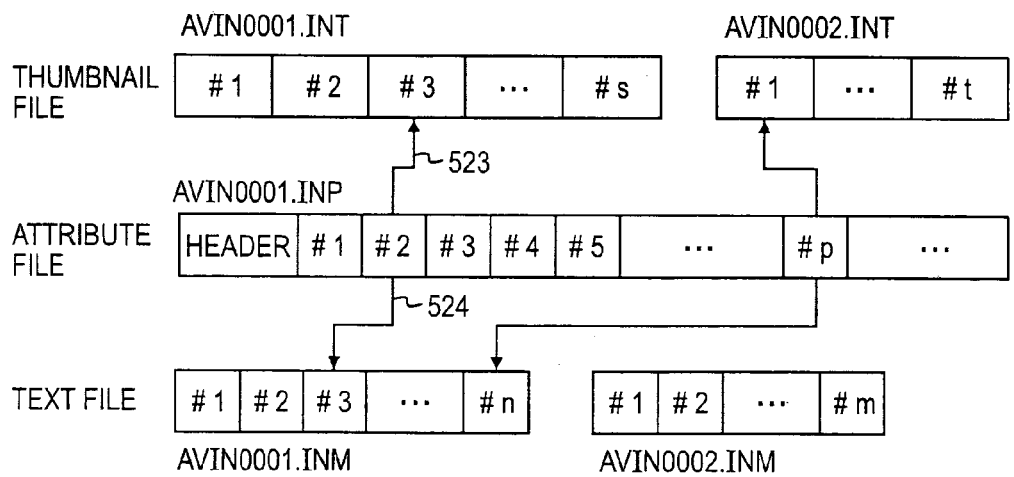
(b)

FIG. 17
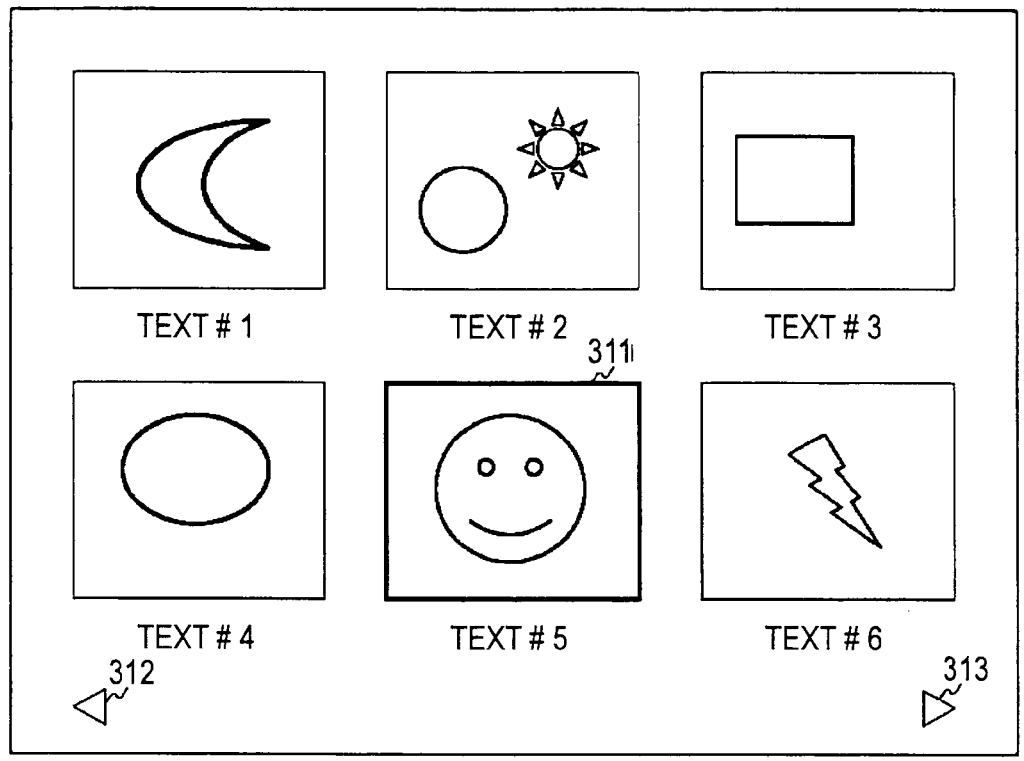
(a)
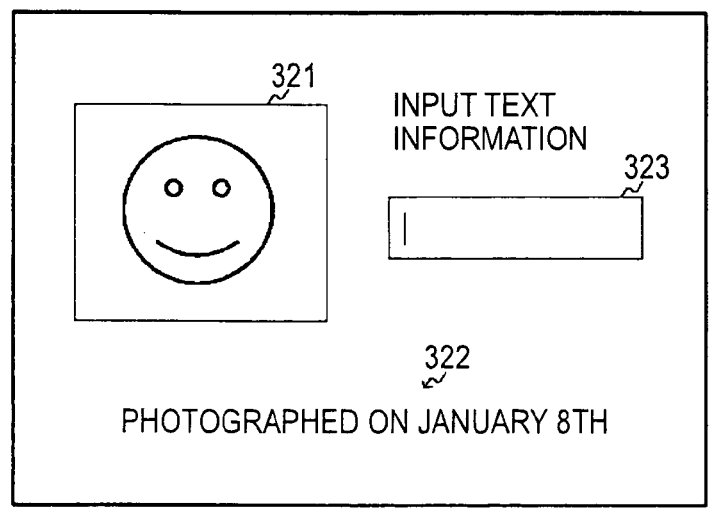
(b)

IMAGE-INFORMATION RECORDING DEVICE AND IMAGE-INFORMATION DISPLAY DEVICE

TECHNICAL FIELD

The present invention relates to image-information recording devices and image-information display devices. In particular, the present invention relates to an image-information recording device for recording image information regarding predetermined image data and an image-information display device for displaying the image information, a method for the devices, and a program for causing a computer to execute the method.

BACKGROUND ART

In recent years, recording devices for recording image data on storage media are widely available. In such a recording device, various types of image data are recorded on a storage medium, thereby making it more difficult to know what type of image data is recorded on the storage medium according to an increase in the amount of image data. In order to roughly know the content of image data recorded on the storage medium, for example, representative images for the image data are presented as thumbnails or text information indicating features of the image data is presented.

As one example of the recording devices, camcorders (camcorder: camera and recorder) perform recording based on a DVD-R (digital versatile disk recordable) standard or a DVD-RW standard in many cases. In this case, up to 99 titles can be recorded per disk and further each title can contain up to 99 chapters (PTT: Part of TiTle). For recording using the camcorder, one recording unit from the start of recording to the end of the recording is recorded as a chapter and recording units are recorded in the same title until a predetermined condition is satisfied. Examples of the predetermined condition for closing the title include a case in which the disk ejected (discharged), 99 chapters are reached in a title, 99 cells are reached in a title, and a the operation is switched from moving-image recording to still-image recording.

With disks recorded by such camcorders, a menu for each title is presented on the top menu. If it is desired to display a menu for each chapter, it is necessary to select a desired title on the top menu before proceeding to a chapter menu for the title (e.g., refer to Japanese Unexamined Patent Application Publication No. 2001-326910 (FIG. 4)).

DISCLOSURE OF INVENTION

In the related art described above, the top menu for performing index display for each title and the chapter menu for performing index display for each chapter are provided on a storage medium. However, the creation of those menus requires predetermined finalization. This finalization generally involves a large amount of time. In addition, available functions of the menus provided on the storage medium are pre-fixed, which may make it impossible to flexibly perform processing corresponding to a search condition desired by a user.

Accordingly, an object of the present invention is to search image information regarding image data, recorded on a storage medium, based on a desired search condition and to perform efficiently display.

The present invention has been made to achieve the foregoing object, and a first aspect of the present invention provides an image-information recording device. The image-information recording device comprises: image-data identifying means for identifying image data based on predetermined image data units and an image data unit group including the image data units; image-information obtaining means for obtaining image information regarding the image data from the identified image data; and image-information recoding means for recording, as image information data, the obtained image information onto a storage medium. The image information data is managed for each data unit on the storage medium. This arrangement provides an advantage in that the image information regarding the image data identified for each image data unit (e.g., a chapter) is efficiently recorded.

In this case, the image information data can be recorded as an image-information file group that has a format in which multiple representative image files and multiple text files are referred to from one attribute file.

The image-information recording device may further comprise: an image information memory for holding image information; and image-information storing means for storing the obtained image information in the image information memory. The image-information recording means may record the image information, stored in the image information memory, in the image-information file group on the storage medium. In this case, it is possible to record image information for each unit (e.g., a title) larger than the image data unit.

Each representative image held in a representative image file in the image information file group may be a first complete image data of each image data unit. More specifically, each representative image may be an I picture in a front-end VOBU of each image data unit.

A second aspect of the present invention provides an image-information display device. The image-information display device comprises: attribute obtaining means for obtaining, with respect to image data identified with predetermined image data units and an image data unit group including the image data units, attributes of image information for the image data from image information data in which the image information is recorded on a storage medium for each image data unit; condition inputting means for prompting input of a search condition regarding an attribute of the image information and receiving the input; and condition searching means for searching the attributes of the image information in accordance with the input search condition; The image-information display device further comprises: representative-image obtaining means for obtaining representative images of the image data for the respective image data units from the image information data in accordance with a result of the searching performed by the condition searching means; and displaying means for displaying a list of the obtained representative images for the respective image data units. This arrangement provides an advantage in that image information data recorded for each image data unit on a storage medium is searched based on a desired search condition and is efficiently displayed.

In this case, the image information data can be recorded as an image-information file group that has a format in which multiple representative image files and multiple text files are referred to from one attribute file.

In the second aspect, the image-information display device may further comprise: ink-information extracting means for extracting link information indicating relationships between the representative images and the image data from the image-information file group; image selecting means for receiving an input of a selected representative image of the displayed representative image list; and image reproducing means for identifying the image data associated with the selected representative image based on the link information and reproducing the image data. This arrangement provides an advantage in that the relationships between the representative images and the image data are made clear and image data associated with a selected representative image is efficiently reproduced.

A third aspect of the present invention provides an image-information recording method for an image-information recording device including an image information memory for holding image information for image data and means for recording, as an image-information file group, the image information onto a storage medium. The recording method comprises a step of identifying image data based on predetermined image data units and an image data unit group including the image data units; a step of obtaining image information regarding the image data from the identified image data of the image data unit; a step of storing the obtained image information in the image information memory; and a step of recording, as an image information file group, image information in the image information stored in the image information memory onto the storage medium for each image data unit. This arrangement provides an advantage in that the image information regarding the image data identified for each image data unit is efficiently recorded.

A fourth aspect of the present invention provides an image-information displaying method for an image-information display device including an image information memory for holding image information. The displaying method comprises: a step of obtaining, with respect to image data identified with predetermined image data units and an image data unit group including the image data units, attributes of image information for the image data from an image-information file group in which the image information is recorded on a storage medium for each image data unit and of holding the attributes in the image information memory; a step of prompting input of a search condition regarding an attribute of the image information and receiving the input; and a step of searching the attributes held in the image information memory in accordance with the input search condition. The displaying method further includes a step of obtaining representative images of the image data for the respective image data units from the image-information file group in accordance with a result of the searching and of holding the representative images in the image information memory; and a step of displaying a list of the representative images for the respective image data units, the representative images being held in the image information memory. This arrangement provides an advantage in that image information data recorded for each image data unit on a storage medium is searched based on a desired search condition and is efficiently displayed.

A fifth aspect of the present invention provides a program for an image-information recording device including an image information memory for holding image information for image data and means for recording, as an image-information file group, the image information onto a storage medium. The program causes a computer to execute: a step of identifying image data based on predetermined image data units and an image data unit group including the image data units; a step of obtaining image information regarding the image data from the identified image data of the image data unit; a step of storing the obtained image information in the image information memory; and a step of recording, as an image information file group, image information in the image information stored in the image information memory onto the storage medium for each image data unit. This arrangement provides an advantage in that the image information regarding the image data identified for each image data unit is efficiently recorded.

A sixth aspect of the present invention provides a program for an image-information display device including an image information memory for holding image information. The program causes a computer to execute: a step of obtaining, with respect to image data identified with predetermined image data units and an image data unit group including the image data units, attributes of image information for the image data from an image-information file group in which the image information is recorded on a storage medium for each image data unit and of holding the attributes in the image information memory; a step of prompting input of a search condition regarding an attribute of the image information and receiving the input; and a step of searching the attributes held in the image information memory in accordance with the input search condition. The program further causes a computer to execute: a step of obtaining representative images of the image data for the respective image data units from the image-information file group in accordance with a result of the searching and of holding the representative images in the image information memory; and a step of displaying a list of the representative images for the respective image data units, the representative images being held in the image information memory. This arrangement provides an advantage in that image information data recorded for each image data unit on a storage medium is searched based on a desired search condition and is efficiently displayed.

BRIEF DESCRIPTION OF THE DRAWINGS

FIG. 14 is a diagram showing an expressing method for slot indices in the attribute file in the embodiment of the present invention.

FIG. 17 is a view showing an example of thumbnails displayed by an index-displaying section 226 in the embodiment of the present invention.

BEST MODE FOR CARRYING OUT THE INVENTION

An embodiment of the present invention will be described next in detail with reference to the drawings.

Figure 1:
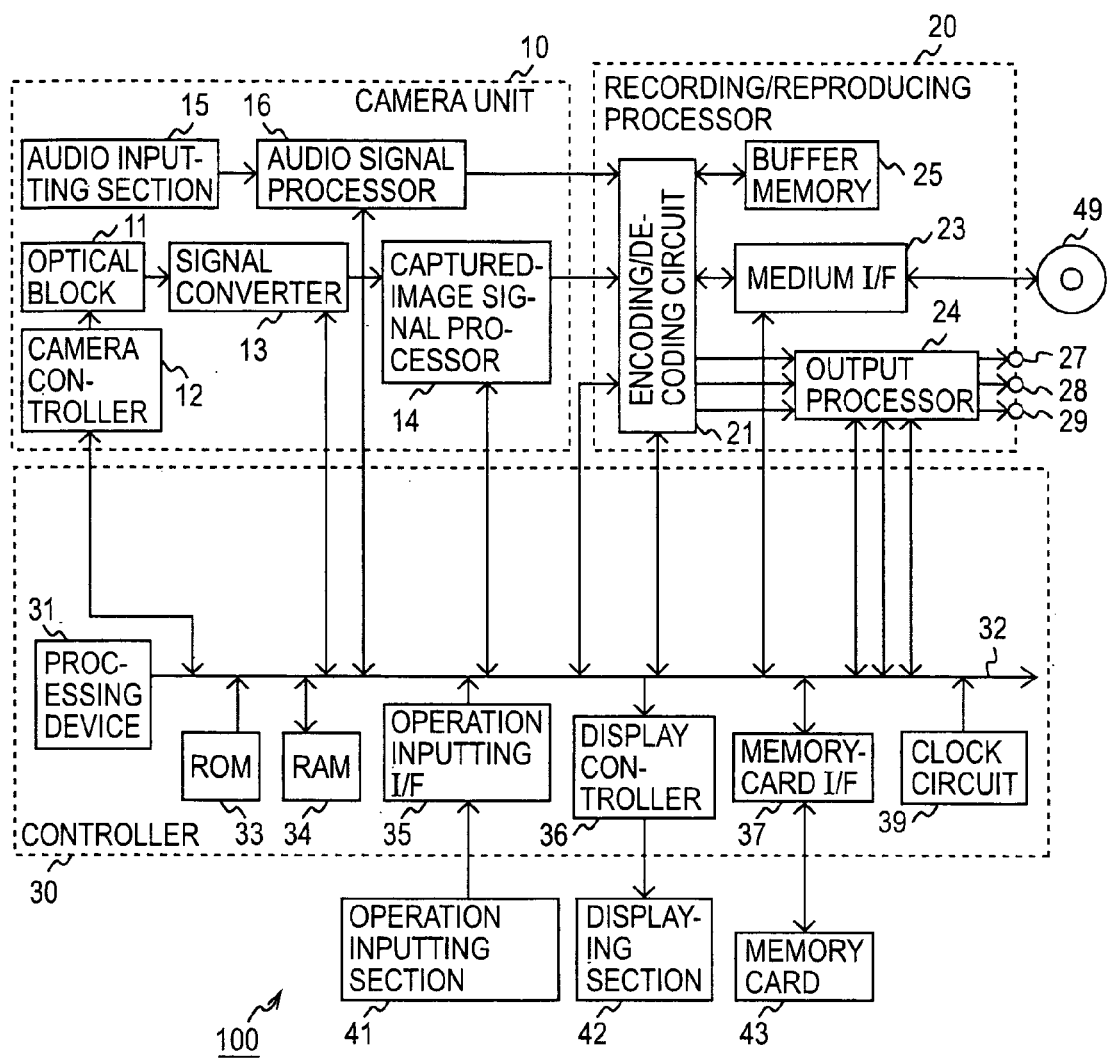
FIG. 1 is a diagram showing the configuration of mobile equipment 100 that serves as an image-information recording device or image-information display device according to an embodiment of the present invention.

FIG. 1 is a diagram showing the configuration of mobile equipment 100 that serves as an image-information recording device or image information display device according to the embodiment of the present invention. This mobile equipment 100 includes a camera unit 10, a reproducing/reproducing processor 20, and a controller 30.

The camera unit 10 includes an optical block 11, a camera controller 12, a signal converter 13, a captured-image signal processor 14, an audio-inputting section 15, and an audio-signal processor 16. The optical block 11 has therein a group of lens for capturing an image of a subject, an aperture adjusting mechanism, a focus adjusting mechanism, a zoom mechanism, a shutter mechanism, a flash mechanism, a hand-shake correcting mechanism, and so on. Upon receiving a control signal from the controller 30, the camera controller 12 generates a control signal to be supplied to the optical block 11. The camera controller 12 then supplies the generated control signal to the optical block 11 to perform control, such as zoom control, shutter control, and exposure control.

The signal converter 13 is implemented with, for example, an image capture device, such as a CCD (charge coupled device), and an image is formed on the image forming surface thereof via the optical block 11. Upon receiving an image-capture timing signal supplied from the controller 30 in accordance with a shutter operation, the signal converter 13 converts a subject image formed on the image-forming surface into a captured-image signal and supplies the captured-image signal to the captured-image signal processor 14.

Based on a control signal from the controller 30, the captured-image signal processor 14 performs processing, such as gamma correction and AGC (auto gain control) on the captured-image signal and also performs processing for converting the captured-image signal into an image signal, which is a digital signal. The audio-inputting section 15 collects sound in the vicinity of a subject during photography. An audio signal from the audio-inputting section 15 is supplied to the audio-signal processor 16. Based on a control signal from the controller 30, the audio-signal processor 16 performs processing, such as correction and AGC, on the audio signal and also performs processing for converting the audio signal into a digital signal.

The recording/reproducing processor 20 includes an encoding/decoding circuit 21, a medium interface 23, an output processor 24, and a buffer memory 25.

The encoding/decoding circuit 21 has an encoding function for converting the image signal and audio signal from the camera unit 10 and/or additional recording information into compressed data by encoding and multiplexing the signals. On the other hand, the encoding/decoding circuit 21 has a decoding function for decoding the image signal and audio signal and/or the additional recording information from the compressed data by demultiplexing the signals. Based on a control signal from the controller 30, the encoding/decoding circuit 21 further performs automatic white-balance control, exposure correction control, enlargement control according to a digital zoom magnification, and the like on the image signal from the captured-image signal processor 14.

Upon receiving the compressed data from the encoding/decoding circuit 21, the medium interface 23 writes the compressed data to a storage medium 49. The medium interface 23 also reads the compressed data from the storage medium 49 and supplies the data to the encoding/decoding circuit 21. Under the control of the controller 30, the output processor 24 supplies the compressed data, sent from the encoding/decoding circuit 21, to the controller 30 and/or output terminals 27 to 29. The buffer memory 25 is implemented with, for example, an SDRAM and is used as a work area for encoding or decoding performed by the encoding/decoding circuit 21.

The controller 30 has a configuration in which a processing device 31, a ROM (read only memory) 33, a RAM (random access memory) 34, an operation inputting interface 35 for connection with an operation-inputting section 41, a display controller 36 for connection with a displaying section 42, a memory card interface 37 for insertion of a memory card 43, and a clock circuit 39 for recording the time of photography are connected through a system bus 32.

The processing device 31 takes charge in the entire processing of the controller 30 and uses the RAM 34 as a work area. The ROM 33 stores a program for controlling the camera unit 10 and a program for executing recording control, reproduction control, and so on of the image signal and audio signal.

The operation-inputting section 41, which is connected to the operation inputting interface 35, is provided with multiple keys, such as a mode switching key for switching between modes such as an photography mode and a reproduction mode, a zoom adjusting key, a key for adjusting the exposure, a shutter key, a key for moving-image photography, and a display adjusting key for the displaying section 42. The operation inputting interface 35 transfers an operation signal, sent from the operation-inputting section 41, to the processing device 31. The processing device 31 determines which key of the operation-inputting section 41 is operated and performs control processing according to the determination result.

The displaying section 42, which is connected to the display controller 36, is implemented with, for example, an LCD (liquid crystal display). Under the control of the processing device 31, the displaying section 42 displays an image signal from the camera unit 10 and an image signal read from the storage medium 49.

The memory card interface 37 stores the compressed data, sent from the encoding/decoding circuit 21, in the memory card 43. The memory-card interface 37 also reads the compressed data from the memory card 43 and supplies the data to the encoding/decoding circuit 21. The clock circuit 39 generates time information indicating year, month, date, time, minute, second, and so on.

Figure 2:
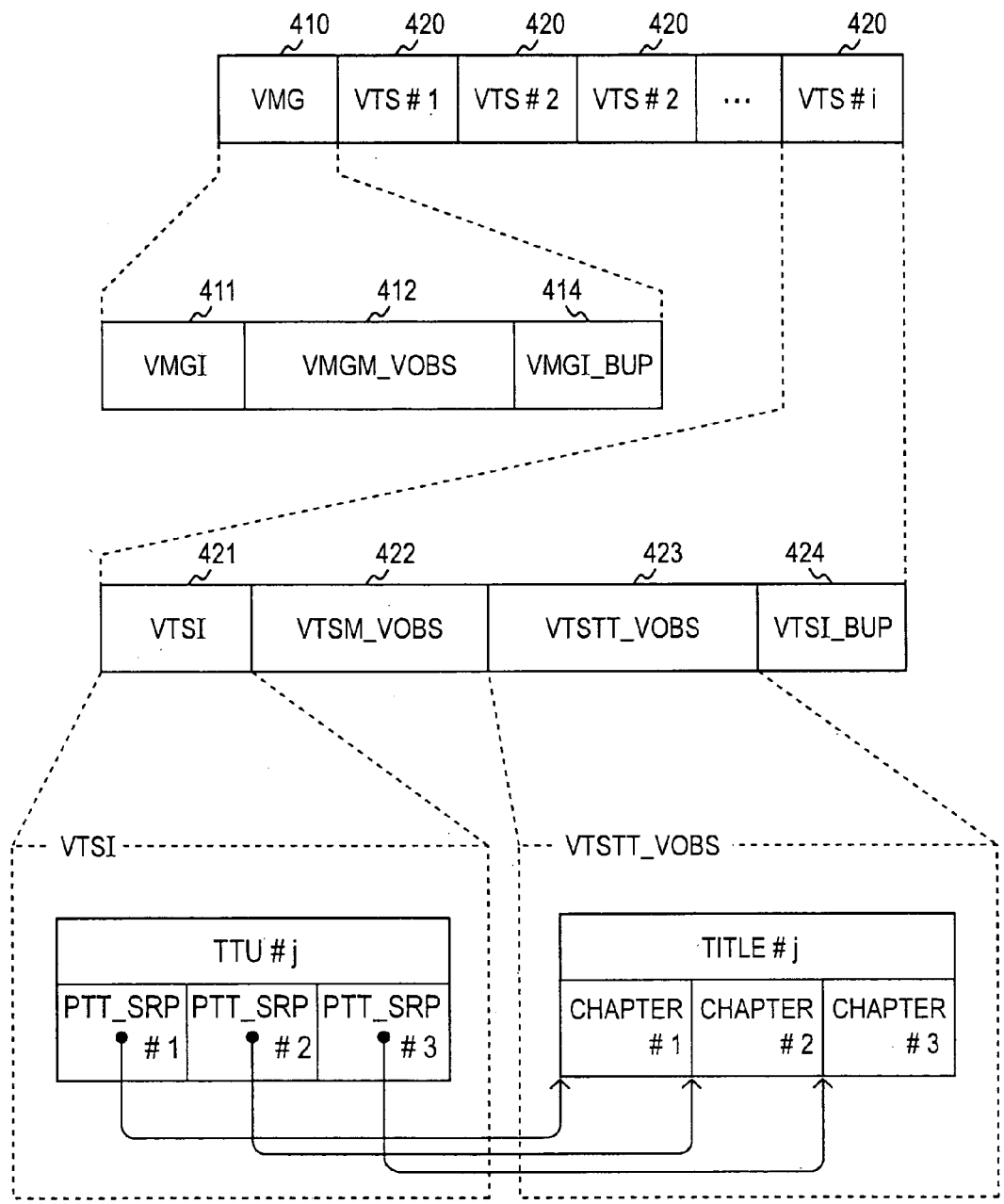
FIG. 2 is a diagram showing the data structure of a disk based on a DVD-Video standard, as one example of a storage medium 49.

FIG. 2 is a diagram showing the data structure of a disk based on a DVD-Video standard, as one example of the storage medium 49. This disk stores a VMG (Video ManaGer) 410, which serves as management information, and at least one VTS (Video Titles Set) 420, which serves as a data storage area.

The VMG 410 has VMGI (VMG Information) 411, a VMGM_VOBS (Video OBject Set for VMG Menu) 412, and VMGI_BUP (VMGI for Back UP) 414. The VMGI 411 holds, for example, control information for a top menu and management information for each title of video content recorded on the disk. The VMGM_VOBS 412 holds data for the top menu. The VMGI_BUP 414 is a back-up copy of the VMGI 411.

Each VTS 420 includes VTSI (VTS Information) 421, a VTSM_VOBS (Video OBject Set for VTS Menu) 422, a VTSTT_VOBS (Video Object Set for Titles in a VTS) 423, and VTSI_BUP (VTSI for Back UP) 424. The VTSI 421 holds control information for a chapter menu, management information and control information for each chapter in titles contained in the corresponding video title set, and so on. The VTSM_VOBS 422 holds data for the chapter menu. The VTSTT_VOBS 423 holds data of a title contained in the video title set. The VTSI_BUP 424 is a back-up copy of the VTSI 421.

As described above, the actual data of video content is recorded in the VTSTT_VOBS 423. Each VTS 420 can store up to 99 titles. However, since the entire disk can also store only up to 99 titles, the maximum number of titles is affected by the use state of the other VTSs.

Each title in the VTS 420 is separated into at least one chapter. The maximum number of chapters in each title is 99. In a camcorder, one recording unit from the start of recording to the end of the recording is recorded as on chapter. For example, until an event in which the disk is ejected, 99 chapters are reached in a title, 99 cells are reached in a title, or the operation is shifted from moving-image recording to still-image recording occurs, chapters are generated in the same title. Thus, when the number of chapters in a title reaches 99 when the camcorder repeatedly performs recording, the title is closed and a next chapter is generated in a new title.

The VTSI 421 holds the starting position of a chapter in each title. The VTSI 421 holds a pointer (PTT_SRP) indicating the starting position of each chapter, as management information (TTU) for each title.

Figure 3:
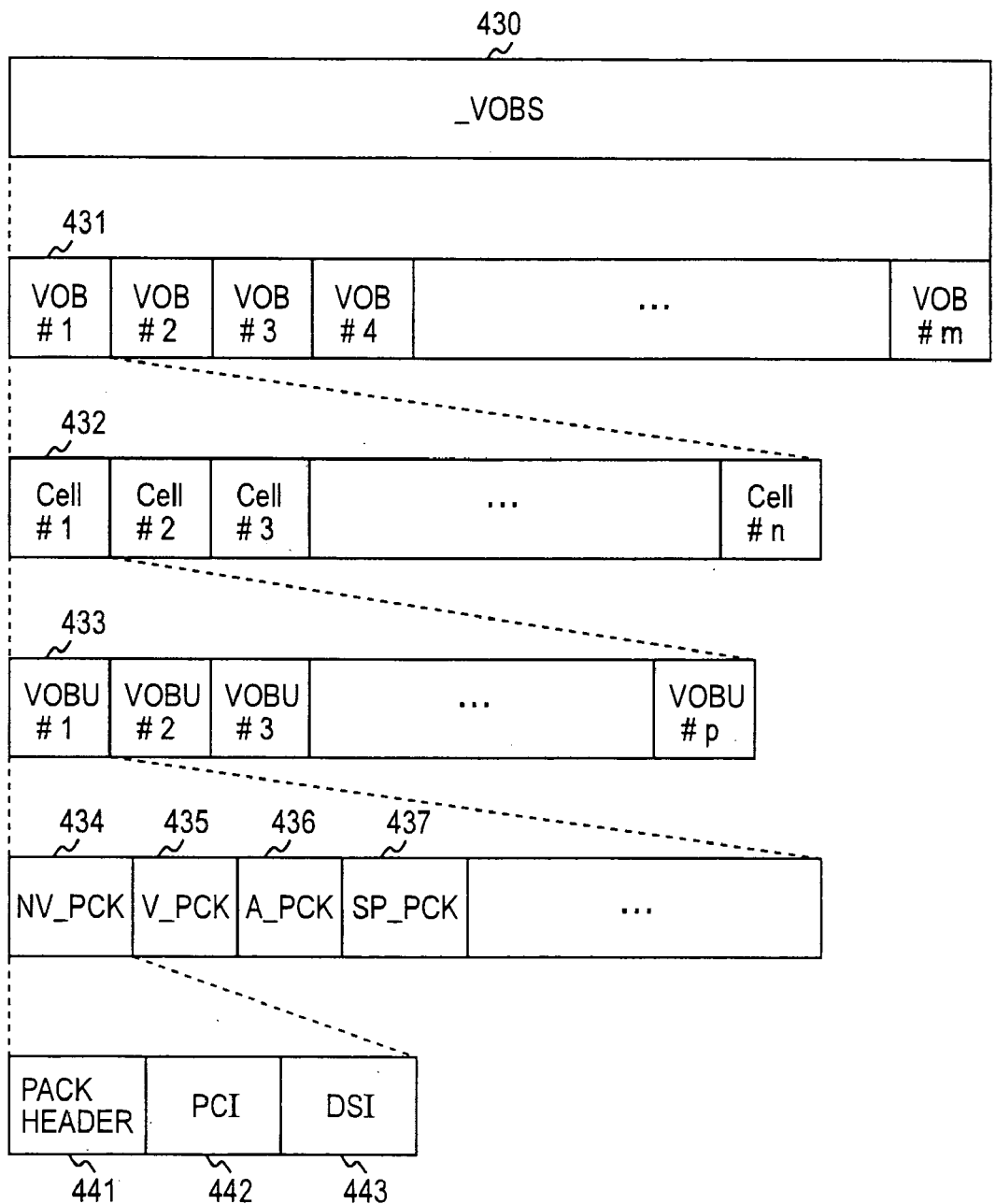
FIG. 3 is a diagram showing elements of a video object set (VOBS).

FIG. 3 is a diagram showing elements of a video object set (VOBS). The VMGM_VOBS 412, the VTSM_VOBS 422, and the VTSTT_VOBS 423 shown in FIG. 2 each hold corresponding data as a video object set (VOBS) and have a common format. This VOBS 430 is a group of one or more video objects (VOB) 431. This VOB 431 is given a VOB_ID number and is used for identification. The VOB 431 is constituted by one or more cells (cells) 432. Each cell 432 is a unit for real-time reproduction and is given a cell ID number in the same manner as the VOB 431.

Each cell 432 contains one or more video object units (VOBU) 433. The VOBU 433 is a pack string that has a navigation pack (NV_PCK) 434 at the front end. The pack refers to 2048 byte constant data and has, in addition to the NV-PCK 434 at the front end, a video pack (V_PCK) 435 for holding video data, audio pack (A_PCK) 436 for holding audio data, and a sub picture pack (SP_PCK) 437 for holding sub picture data, and so on, as required. The NV_PCK 434 holds, subsequent to a pack header 441, a representation control information (PCI: presentation control information) 442 and data search information (DSI: data search information) 443. The PCI 442 is control information regarding reproduction display and holds angle information for non-seamless reproduction, information for highlighting display of a sub picture, and so on. The DSI 443 is control information for accessing the disk and holds angle information for seamless reproduction, VOBU search information for each reproduction time (0.5 second×n), and so on.

Figure 4:
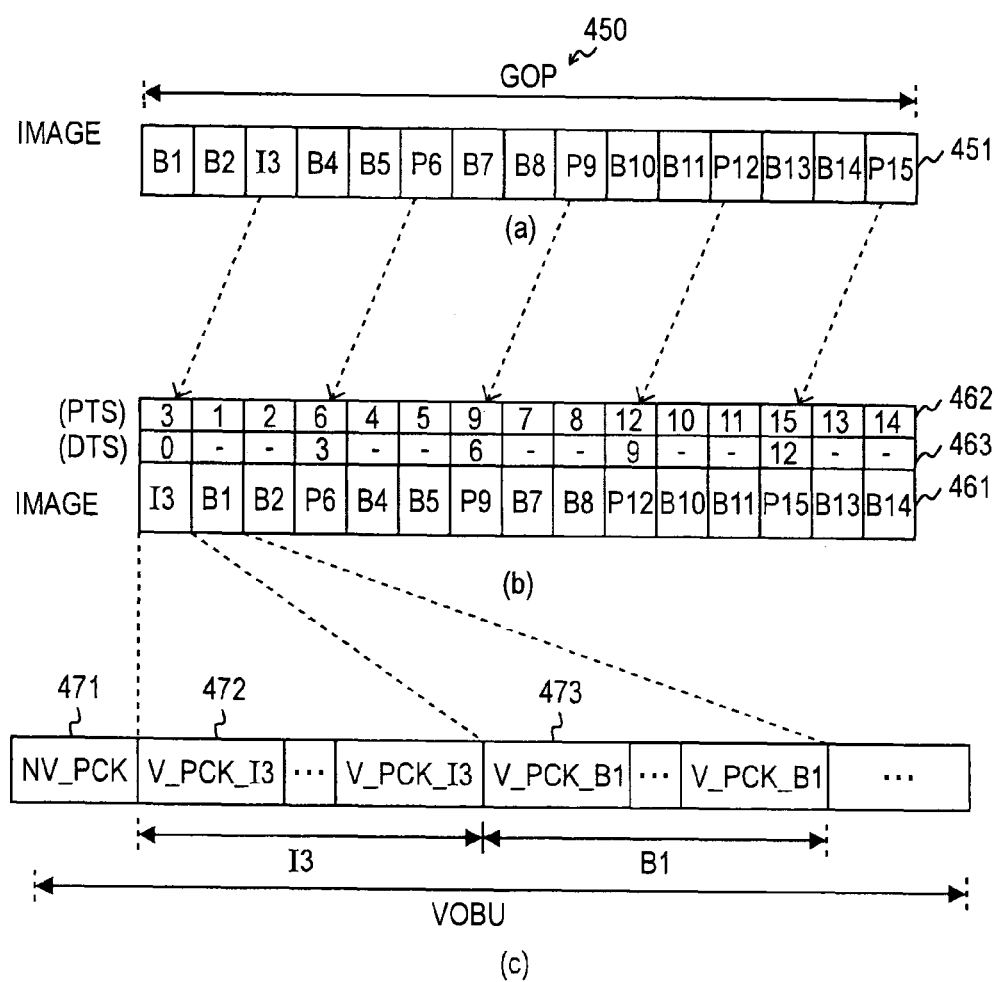
FIG. 4 is a diagram showing the relationship between a video object unit (VOBU) and an encoded image.

FIG. 4 is a diagram showing the relationship between a video object set (VOBU) and an encoded image. Image data in the VOBS 430 is encoded by an MPEG-2 (Moving Picture Coding Experts Group-2) encoding system. In the MPEG-2 encoding system, 15 images called the GOP (Group Of Pictures) expresses a moving image of about 0.5 second. FIG. 4(a) shows a state in which a GOP 450 is constituted by a total of 15 images 451 including one I picture, four P pictures, and ten B pictures. The I picture is an in-frame encoded image and a complete image that is encoded independently of the other P and B pictures. On the other hand, each P picture is encoded utilizing a difference from a previous I or P picture. Each B picture is also encoded utilizing a difference from a previous and subsequent I or P pictures. Thus, only the I picture can be independently decoded in a GOP.

Figure 15:
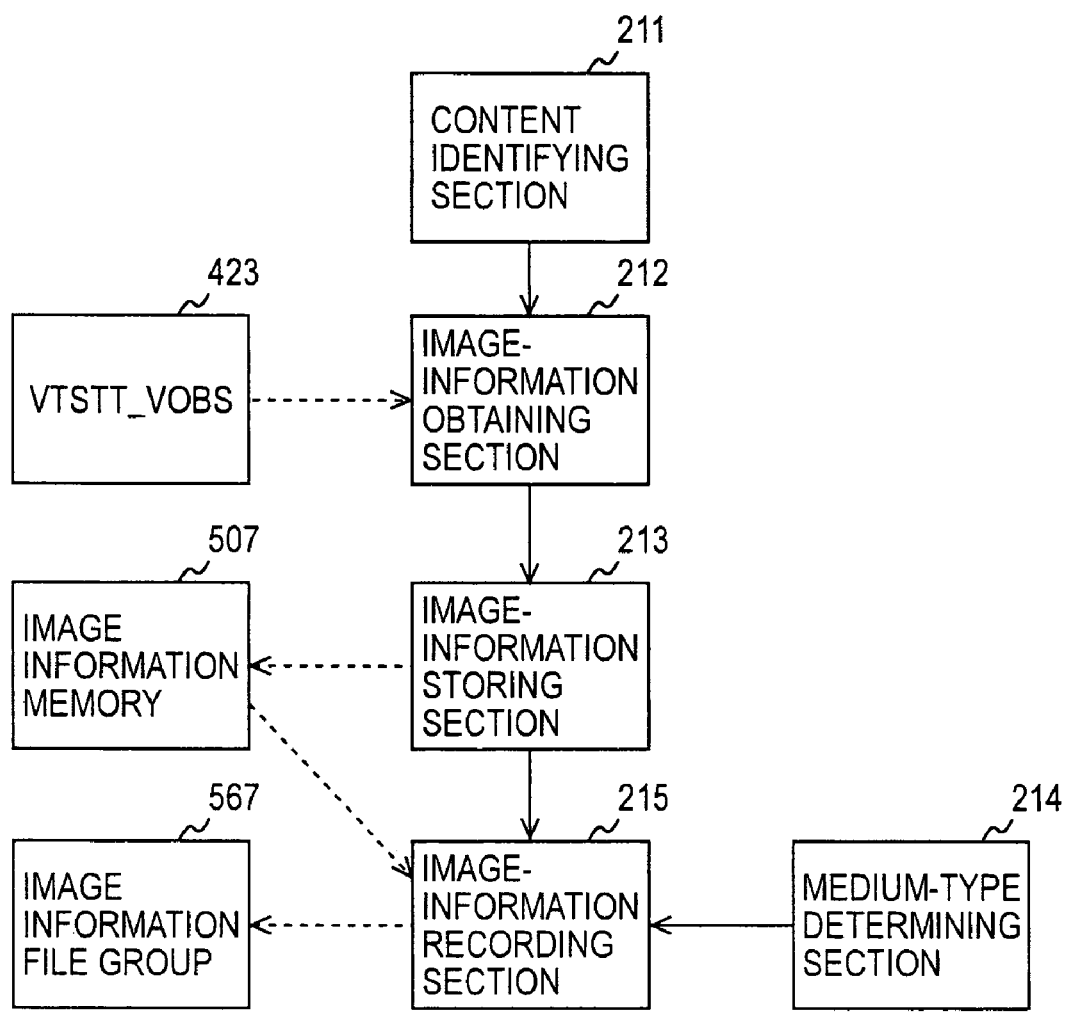
FIG. 15 is a diagram showing an example of a functional configuration for recording image information in the embodiment of the present invention.

As shown in FIG. 4(b), 15 images in the GOP are recorded with the orders of some of the images being replaced as shown in FIG. 4(b). This is based on a feature of the above-noted encoding system and is to prevent waiting for a subsequent image during decoding. For example, although an I picture (I3) and a P picture (P6) must be referred to in order to decode a B picture (B5), performing replacement as shown in FIG. 4(b) causes the necessary image data (I3 and P6) to be ready at a point when the B picture (B5) is decoded. In order to maintain such a sequence relationship of the image 461, time stamps called PTSs (Presentation Time Stamps) 462 and DTSs (Decoding Time Stamps) 463 are applied. The PTS 462 is time management information for reproduction/output and indicates when a unit image to which the time stamp is applied is reproduced and output. On the other hand, the DTS 463 is time management information for decoding and indicates when a unit image to which the time stamp is applied is decoded.

Each encoded image is encapsulated into one or more packs, as shown in FIG. 4(c). For example, the I picture (I3) is held as V_PCK_I3 (472) and the B picture (B1) is held as V_PCK_B1 (473). They constitute the VOBU in conjunction with a pack NV_PCK 471 and so on.

Figure 5:
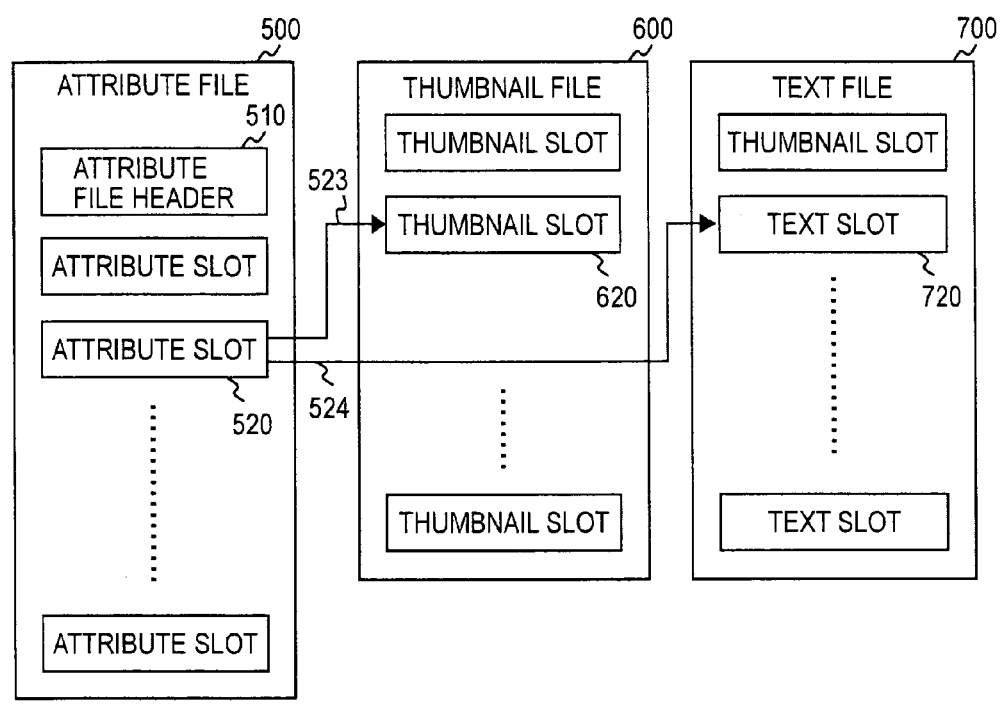
FIG. 5 is a diagram showing a first configuration example of an image-information file group in the embodiment of the present invention.

FIG. 5 is a diagram showing a first configuration example of an image-information file group in the embodiment of the present invention. This image-information file group is a group of files holding image information regarding image data recorded on a storage medium and includes an attribute file 500, a thumbnail file 600, and a text file 700. The attribute file 500 includes one attribute file header 510 and at least one attribute slot 520. The capacity of each attribute slot 520 has a fixed length in the attribute file 500. The internal configuration of the attribute file 500 will be described below.

The thumbnail file 600 has at least one thumbnail slot 620. Each thumbnail slot 620 holds a thumbnail, which serves as a representative image for image data recorded on the storage medium. Using the thumbnail, for example, an image belonging to each chapter can be selected for each chapter. As illustrated in FIG. 4, the I picture in each VOBU is encoded independently of other P and B pictures and is thus suitable for being retrieved as a single image. Thus, in principle, it is desired that the I picture in the front-end VOBU in the starting cell in a chapter be selected as a representative image. The capacity of each thumbnail slot 620 has a fixed length in the thumbnail file 600. Each thumbnail slot 620 is given an index number indicating the sequence from the front end of the thumbnail file 600.

The text file 700 has at least one text slot 720. Each text slot 720 holds text information regarding image data recorded on the storage medium. This text information includes an arbitrary character string input by a user and can include, for example, the name of a place where the image data is photographed, the title of the image data, and so on. The capacity of each text slot 720 has a fixed length in the text file 700. Each text slot 720 is given an index number indicating the sequence from the front end of the text file 700.

A thumbnail slot index 523 indicates a thumbnail slot 620 corresponding to an attribute slot 520 and a text slot index 524 indicate a text slot 720 corresponding to an attribute slot 520, as described below.

Figure 6:
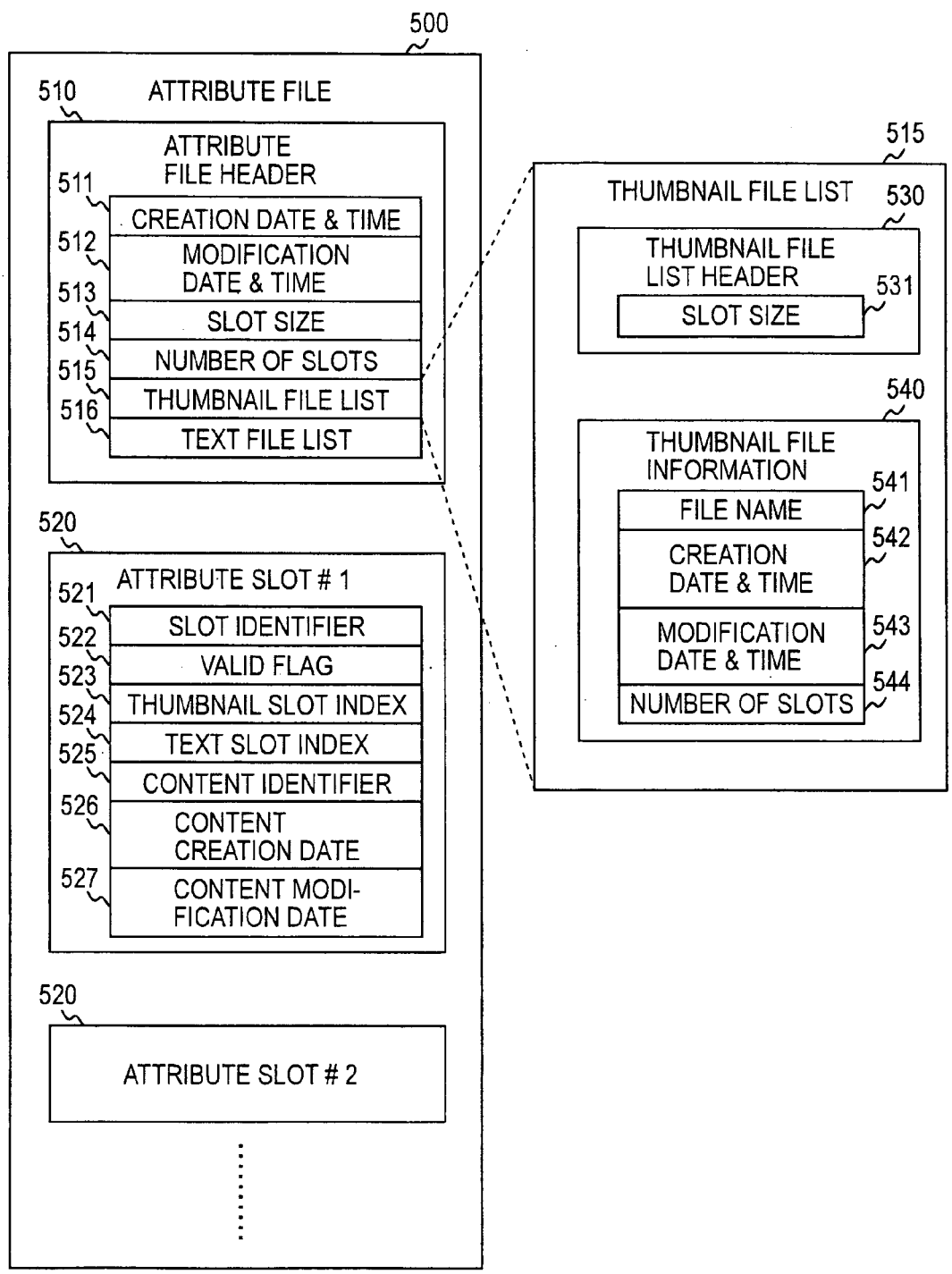
FIG. 6 is a diagram showing a first internal-configuration example of an attribute file 500 in the embodiment of the present invention.

FIG. 6 is a diagram showing a first internal-configuration example of the attribute file 500 in the embodiment of the present invention. An attribute file header 510 in the attribute file 500 contains creation date and time 511, modification date and time 512, a slot size 513, the number of slots 514, a thumbnail file list 515, and a text file list 516.

The creation date and time 511 indicates date and time when the attribute file 500 was initially created. The modification date and time 512 indicates date and time when the attribute file 500 was modified last time. The slot size 513 indicates the capacity of each attribute slot 520 in the attribute file 500. As described above, the capacity of each attribute slot 520 has a fixed length in the attribute file 500. The number of slots 514 indicates the number of attribute slots 520 contained in the attribute file 500.

The thumbnail file list 515 and the text file list 516 are lists for holding information regarding the thumbnail file 600 and the text file 700, respectively. For example, the thumbnail file list 515 has one thumbnail file list header 530 and one piece of thumbnail file information 540. The thumbnail file list header 530 contains a slot size 531 indicating the capacity of each thumbnail 620 in the thumbnail 600. As described above, the capacity of each thumbnail slot 620 has a fixed length in the thumbnail file 600.

The thumbnail file information 540 includes a file name 541, creation date and time 542, modification date and time 543, number-of-slots 544, and a front-end sequence number 545. The file name 541 indicates the file name of the thumbnail file 600. The creation date and time 542 indicates date and time when the thumbnail file 600 was initially created. The modification date and time 543 indicates date and time when the thumbnail file 600 was modified last time. The number of slots 544 indicates the number of thumbnail slots 620 contained in the thumbnail file 600.

While an example of the thumbnail file list 515 has been described above, the text file list 516 holds information regarding the text file 700 in the same manner.

The attribute slot 520 contains a slot identifier 521, a valid flag 522, a thumbnail slot index 523, a text slot index 524, a content identifier 525, content creation date 526, and content modification date 527. The slot identifier 521 indicates an identifier uniquely identifying the attribute slot 520. The slot identifier 521 can be used to associate different attribute slots 520. For example, since the capacity of the thumbnail slot 620 has a fixed length, one thumbnail may not be accommodated in one thumbnail file 620. In such a case, the arrangement may be such that multiple attribute slots 520 are associated using the slot identifiers 521 and one thumbnail is accommodated in multiple thumbnail slots 620. Since such association tends to be complicated, it is desired that the capacity of each thumbnail slot 620 be set so as to substantially match the size of the thumbnail.

The valid flag 522 indicates whether or not content included in the attribute slot 520 is valid. The thumbnail slot index 523 is an index number indicating a corresponding thumbnail slot 620. The text slot index 524 is an index number indicating a corresponding text slot 720. The content identifier 525 is link information indicating corresponding content (image data). The content creation date 526 indicates date and time when the corresponding content was initially created. The content modification date 527 indicates date and time when the corresponding content was modified last time.

Figure 7:
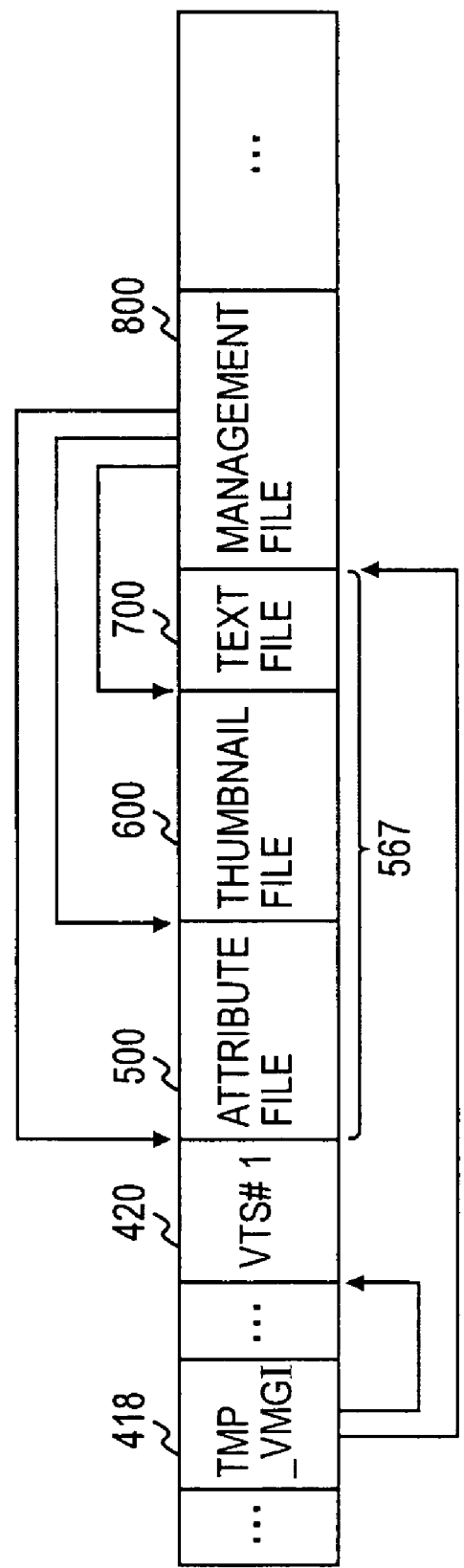
FIG. 7 is a diagram showing the recording state of a storage medium based on a ROW mode for the image-information file group in the embodiment of the present invention.

FIG. 7 is a diagram showing the recording state of the storage medium based on a ROW mode for the image-information file group in the embodiment of the present invention. The ROW mode (Restricted OverWrite mode) is used in order to record a video format for DVD-RW media. This ROW mode has a feature in that overwriting is possible but only sequential writing is possible to perform recording to an unrecorded area. In contrast, an INC mode (Incremental recording) is used in order to record a video format for DVD-R media. The INC mode is a sequential writing and has a feature in that data once written cannot essentially be overwritten.

When image data is recorded on the storage medium, an image-information file group 567 and a management file 800 for managing the image-information file group 567 are recorded immediately after a VTS 420. The management file 800 holds the starting address and the size of each of the attribute file 500, the thumbnail file 600, and the text file 700 in the image-information file group 567.

The storage places of the VTS 420 and the management file 800 are held in a temporary VMGI (TMP_VMGI: TeMPorary Video ManaGer Information) 418. The temporary VMGI 418 temporarily manages recorded actual data information and is recorded in the vicinity of the lead-in area when recording is performed in the ROW mode.

Figure 8:
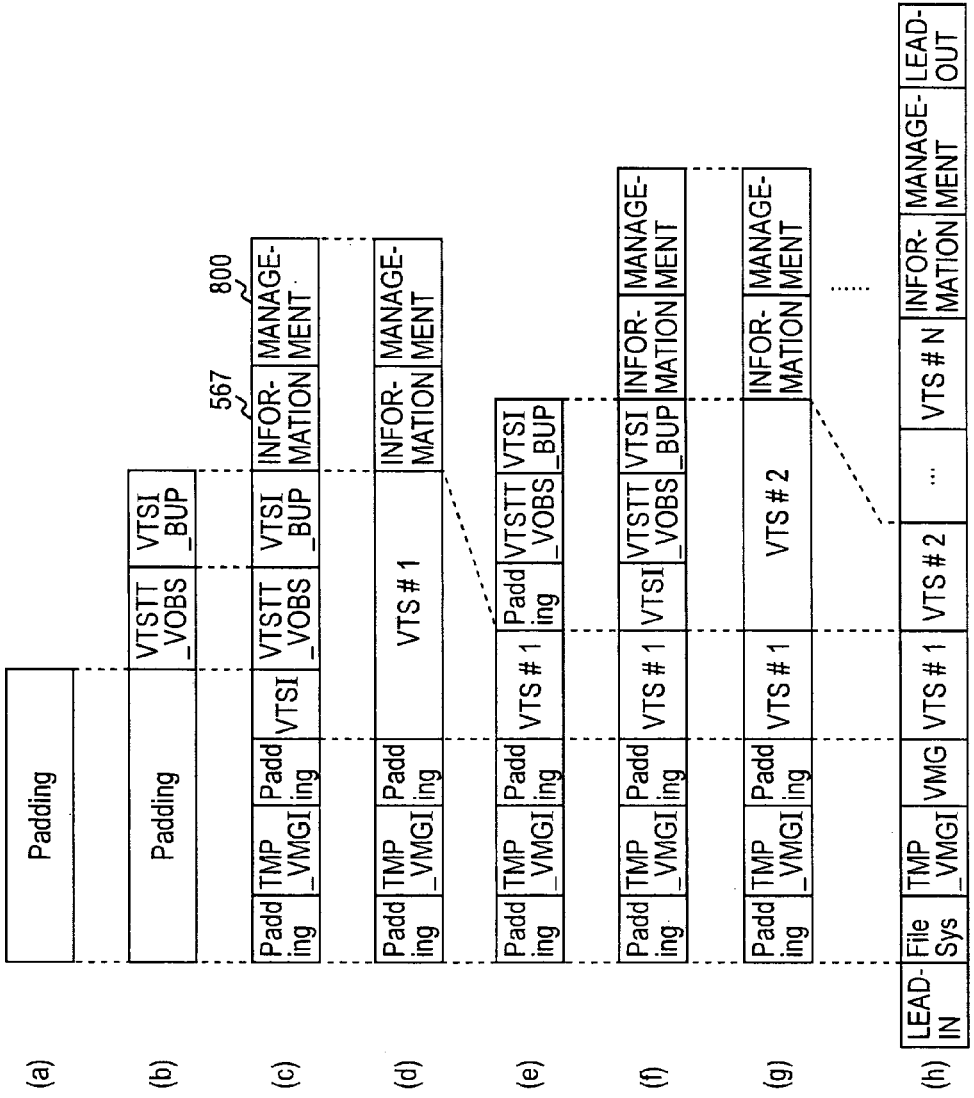
FIG. 8 is a diagram showing a ROW-mode recording procedure in the embodiment of the present invention.

FIG. 8 is a diagram showing a ROW-mode recording procedure in the embodiment of the present invention. In the ROW mode, then entire data area is writable. As shown in FIG. 8(a), first, padding, which includes constant data or the like, is written in order to reserve an area for a file system and areas for VMG and VTSI. With this arrangement, the position of an address NWA (Next Writable Address) to which recording is performed next moves toward the outer circumference.

In FIG. 8(b), actual data VTSTT_VOBS is recorded. Information for VTSI is then generated and is recorded as VTSI_BUP subsequent to the VTSTT_VOBS.

In FIG. 8(c), the VISI is recorded before the VTSTT_VOBS. The image-information file group 567 and the management file 800 are recorded immediately after the VTSI_BUP. Further, TMP_VMGI is recorded between the area for the file system and the area for the VMG. At this point, a first video title set (VTS #1) is completed (FIG. 8(d)).

In FIG. 8(e), immediately after the VTS #1, an area for a next VTSI is reserved and, immediately after the area, next actual data VTSTT_VOBS is recorded. That is, an area for a second video title set (VTS #2) is overwritten on the image-information file group 567 and the management file 800 regarding the first video title set (VTS #1). Information for VTSI is then generated and is recorded as VTSI_BUP subsequent to the VTSTT_VOBS.

In FIG. 8(f), VTSI is recorded before the VTSTT_VOBS. Immediately after the VTSI_BUP, an image-information file group and a management file therefor are recorded. Additionally, TMP_VMGI is overwritten between the area for the file system and the area for the VMG. At this point, the second video title set (VTS #2) is completed.

In FIG. 8(g), subsequent video title sets are recorded according to a procedure as described above.

In FIG. 8(h), in finalization, a file system and a VMG are created from the management information of each title in the TMP_VMGI and are recorded in the area reserved by the padding (FIG. 8(a)). Further, a lead-in area and a lead-out area are recorded.

In this manner, in the ROW mode, the image-information file group 567 containing old information and the management file 800 therefor are replaced with a new video title set and the latest image-information file group and the management file therefor are eventually recorded together in one place.

The above description has been given of a case in which the image-information file group is recorded immediately after the video title set. Alternatively, for example, the arrangement may be such that a dedicated area for recording the image-information file group is pre-secured on the storage medium and is updated every time a tile is closed.

Figure 9:
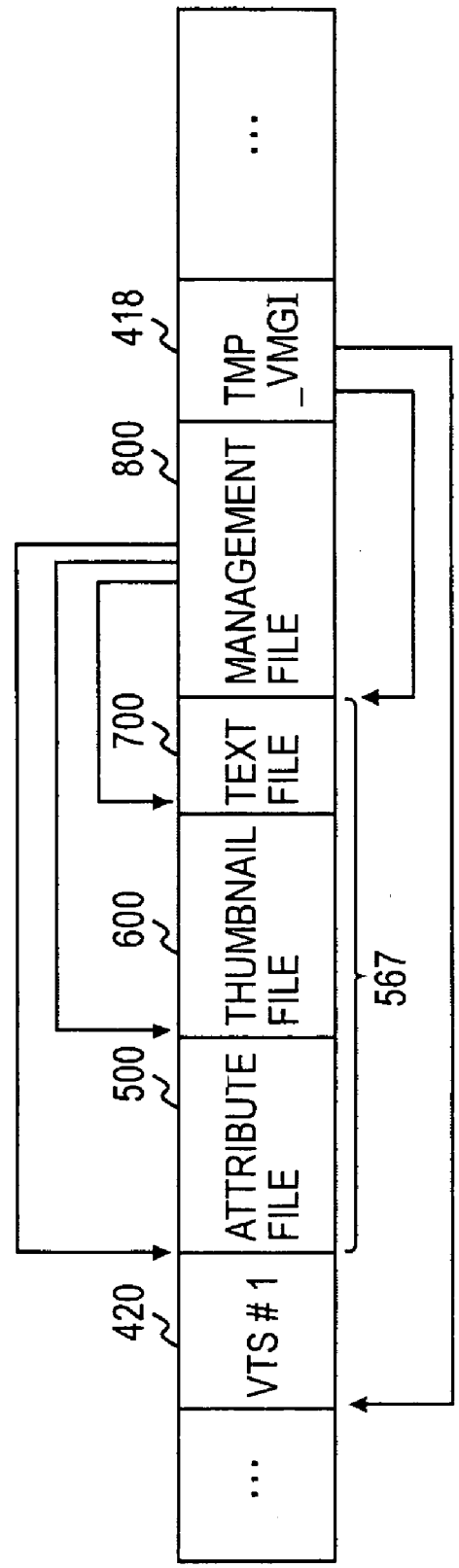
FIG. 9 is a diagram showing the recording state of a storage medium based on an INC mode for the image-information file group in the embodiment of the present invention.

FIG. 9 is a diagram showing the recording state of a storage medium based on an INC mode for the image-information file group in the embodiment of the present invention. The temporarily VMGI 418 is recorded adjacent to the lead-in area when recording is performed in the ROW mode, as shown in FIG. 7, whereas the temporarily VMGI 418 is recorded immediately after the management file 800 when recording is performed in the INC mode. This is because content in the same area cannot be overwritten in the case of the INC mode and thus the VMGI 418 cannot be continuously held in the same area.

Figure 10:
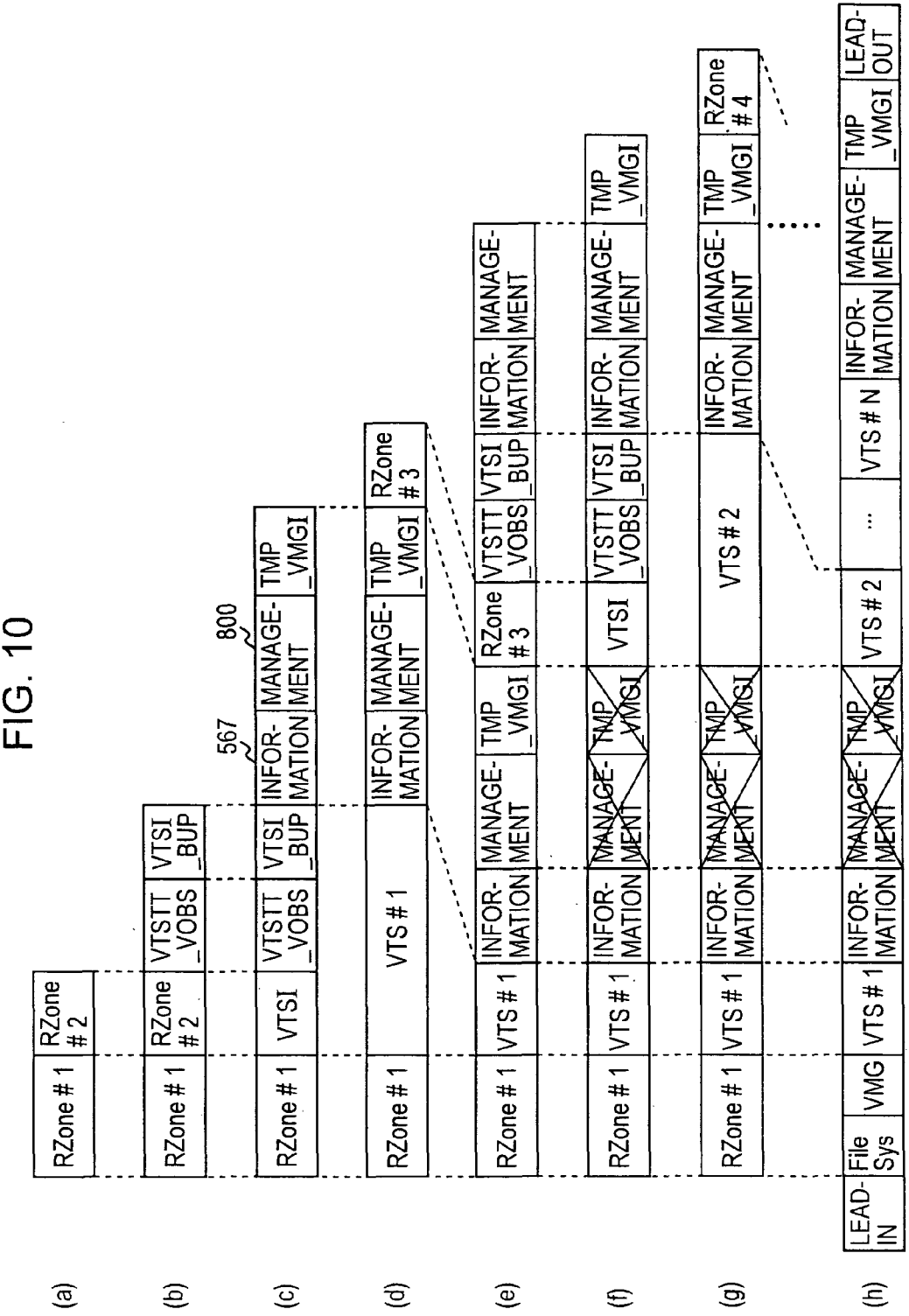
FIG. 10 is a diagram showing an INC-mode recording procedure in the embodiment of the present invention.

FIG. 10 is a diagram showing an INC-mode recording procedure in the embodiment of the present invention. In the case of the INC mode, it is defined that the maximum number of areas that are writable at a time is three, and the areas are referred to as "RZones". The RZones are also managed by the aforementioned RMA. As shown in FIG. 10(a), an area (RZone #1) for a file system and an area (RZone #2) for VTSI are reserved. An area (not shown) that follows the RZone #2 is an invisible RZone to which data is effectively recordable.

In FIG. 10(b), actual data VTSTT_VOBS is recorded. Information for VTSI is then generated and is recorded as VTSI_BUP subsequent to the VTSTT_VOBS.

In FIG. 10(c), VTSI is recorded in the RZone #2. An image-information file group 567 and a management file 800 are recorded immediately after the VTSI_BUP. Subsequently, TMP_VMGI is further recorded in the management file 800. At this point, a first video title set (VTS #1) is completed.

In FIG. 10(d), an area (RZone #3) for a next video title set is reserved subsequent to the VTS #1.

In FIG. 10(e), next actual data VTSTT_VOBS is recorded. Information for VTSI is then generated and is recorded as VTSI_BUP subsequent to the VTSTT_VOBS.

In FIG. 10(f), VTSI is recorded in the RZone #3. Immediately after the VTSI_BUP, an image-information file group and a management file therefor are recorded. Subsequently, TMP_VMGI is further recorded. At this point, a second video title set (VTS #2) is completed.

At this point, information for the VTS #1 and the VTS #2 has been recorded in the TMP_VMGI. In the middle of writing, the TMP_VMGI and the management file are recorded in multiple places, and TMP_VMGI and a management file that are located at the outermost circumference is the latest. Subsequent processing is also carried out in accordance with the latest TMP_VMGI and management file.

In FIG. 10(g), subsequent video title sets are recorded according to a procedure as described above.

In FIG. 10(h), in finalization, a file system and a VMG are created from each-title management information in the latest TMP_VMGI and are recorded in the RZone #1. Further, a lead-in area and a lead-out area are recorded.

Figure 11:
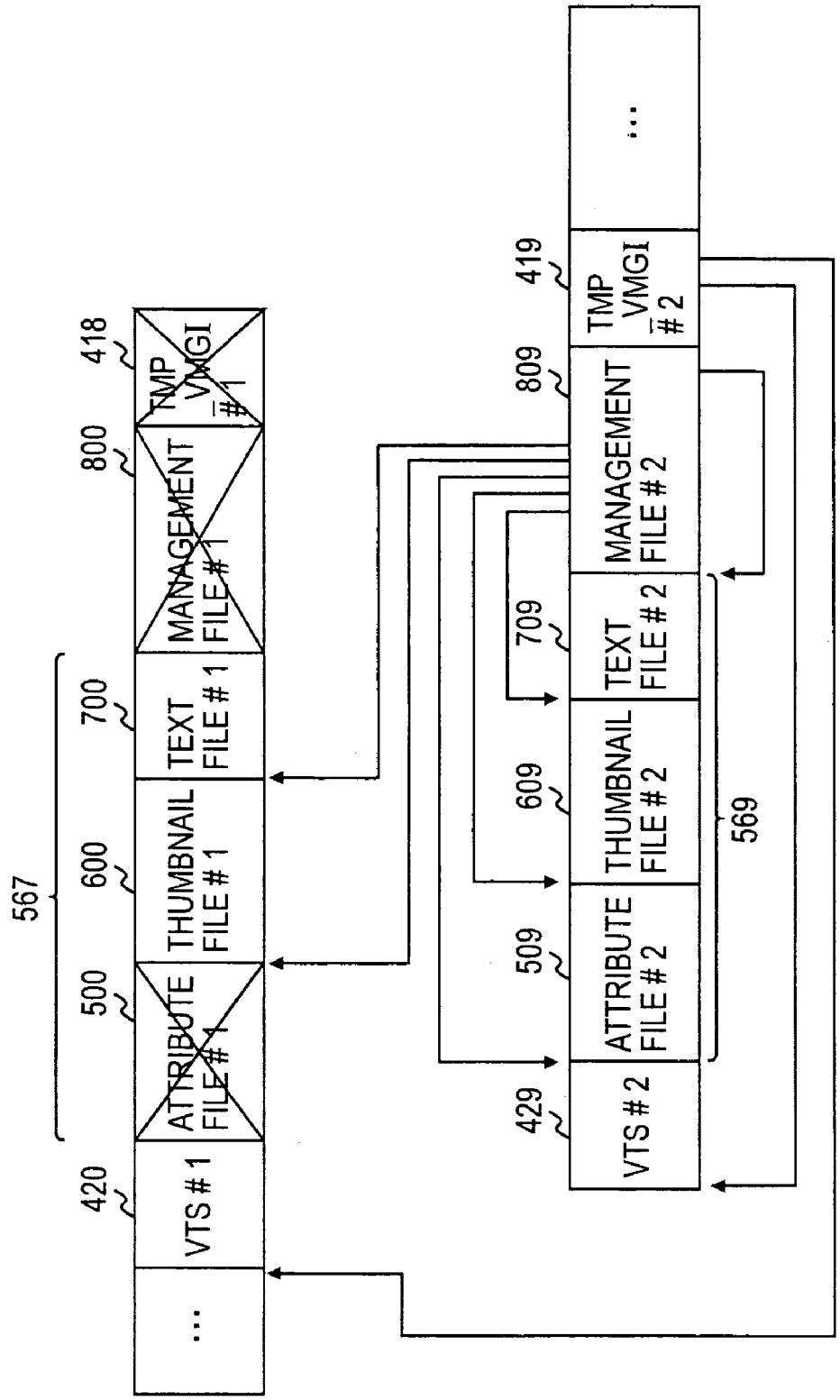
FIG. 11 is a diagram showing one example of the recording state of a storage medium while the image-information file group in the embodiment of the present invention is recorded in the INC mode.

FIG. 11 is a diagram showing one example of the recording state of a storage medium while the image-information file group in the embodiment of the present invention is recorded in the INC mode. As described above, the image-information file group 567 and the management file 800 for managing the image-information file group 567 are recorded immediately after the first video title set VTS #1 (420). TMP_VMGI #1 (418) is recorded immediately after the management file 800. This state corresponds to (c) in FIG. 10.

Thereafter, when a second video title set VTS #2 (429) is recorded, an image-information file group 569 and a management file #2 (809) are recorded immediately after the video title set VTS #2 (429). A thumbnail file #2 (609) and a text file #2 (709) in the image-information file group 569 hold only information regarding the second video title set VTS #2 (429). This is because, particularly for the case of a thumbnail file, the capacity thereof is increased. That is, recording the content recorded in the thumbnail file #1 (600) to the thumbnail file #2 (609) consumes an area on the storage medium.

The attribute file #2 (509) holds index numbers so as to allow the thumbnail file #1 (600), the text file #1 (700), the thumbnail file #2 (609), and the text file #2 (709) to be referred to. Thus, the attribute file #1 (500) is not required.

The management file #2 (809) holds the starting address and the size of each of the thumbnail file #1 (600), the text file #1 (700), the attribute file #2 (509), the thumbnail file #2 (609), and the text file #2 (709). Thus, the management file #1 (800) is not required.

In addition, TMP_VMGI #2 (419) holds the storage positions of the VTS #1 (420), the VTS #2 (429), and the management file #2 (809). Thus, the TMP_VMGI #1 (418) is not required.

The storage areas of the unnecessary attribute file #1 (500), the management file #1 (800), and the TMP_VMGI #1 (418) cannot be reused in the INC mode, and thus the areas are left unchanged.

Figure 12:
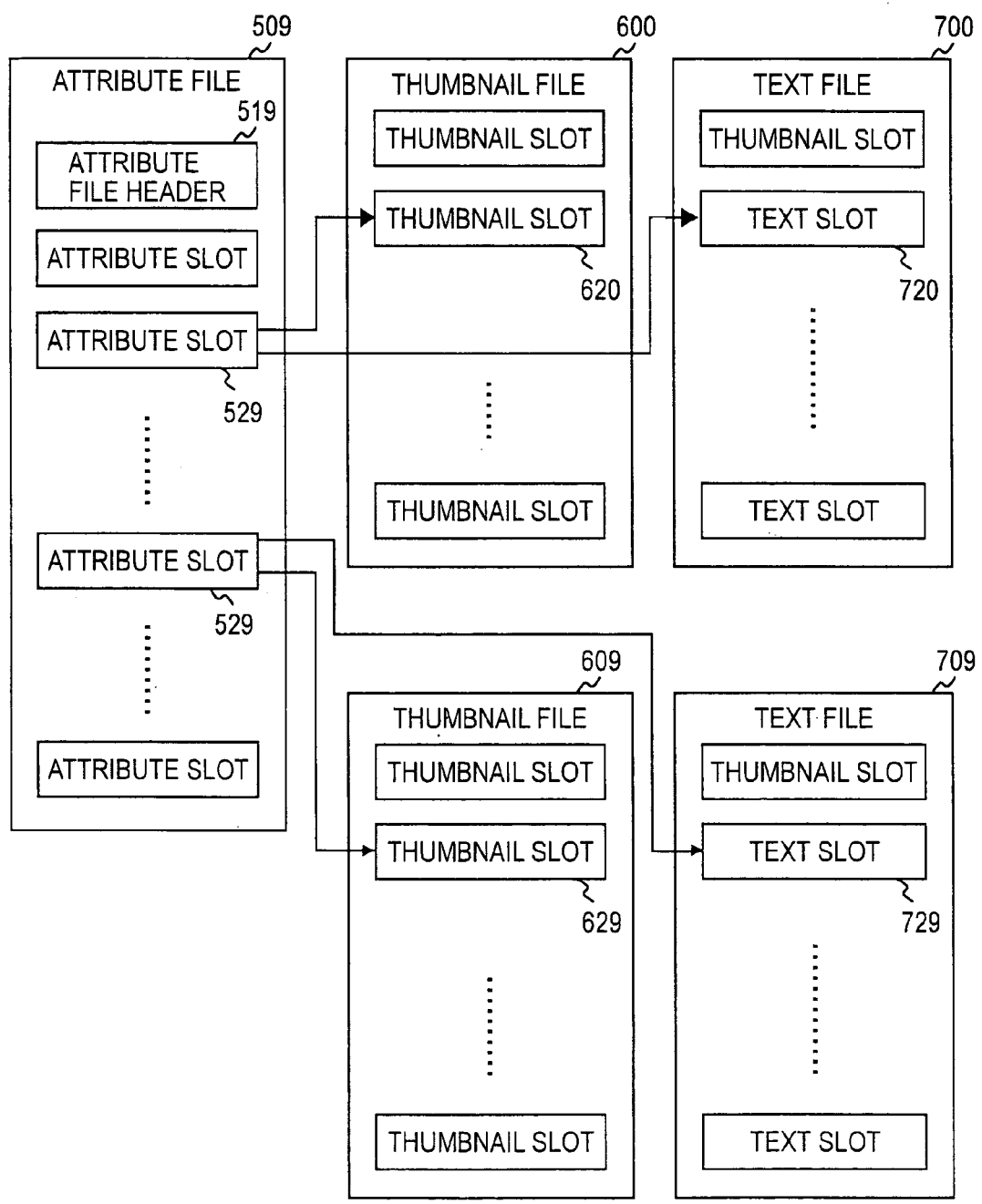
FIG. 12 is a diagram showing a second configuration example of the image-information file group in the embodiment of the present invention.

FIG. 12 is a diagram showing a second configuration example of the image-information file group in the embodiment of the present invention. As illustrated in FIGS. 10 and 11, since multiple thumbnail files and multiple text files exist on the storage medium in the INC mode, there is a possibility that they are discretely recorded on the storage medium. This, therefore, requires a configuration that allows multiple thumbnails and multiple text files to be referred to from one attribute file. An example of the configuration of the image-information file group in such a case is shown in FIG. 12.

That is, for the presence of multiple thumbnails 600 to 609 and multiple text files 700 to 709, attribute slots 529 in the attribute file 509 hold index numbers so as to allow any of the files to be referred to.

Figure 13:
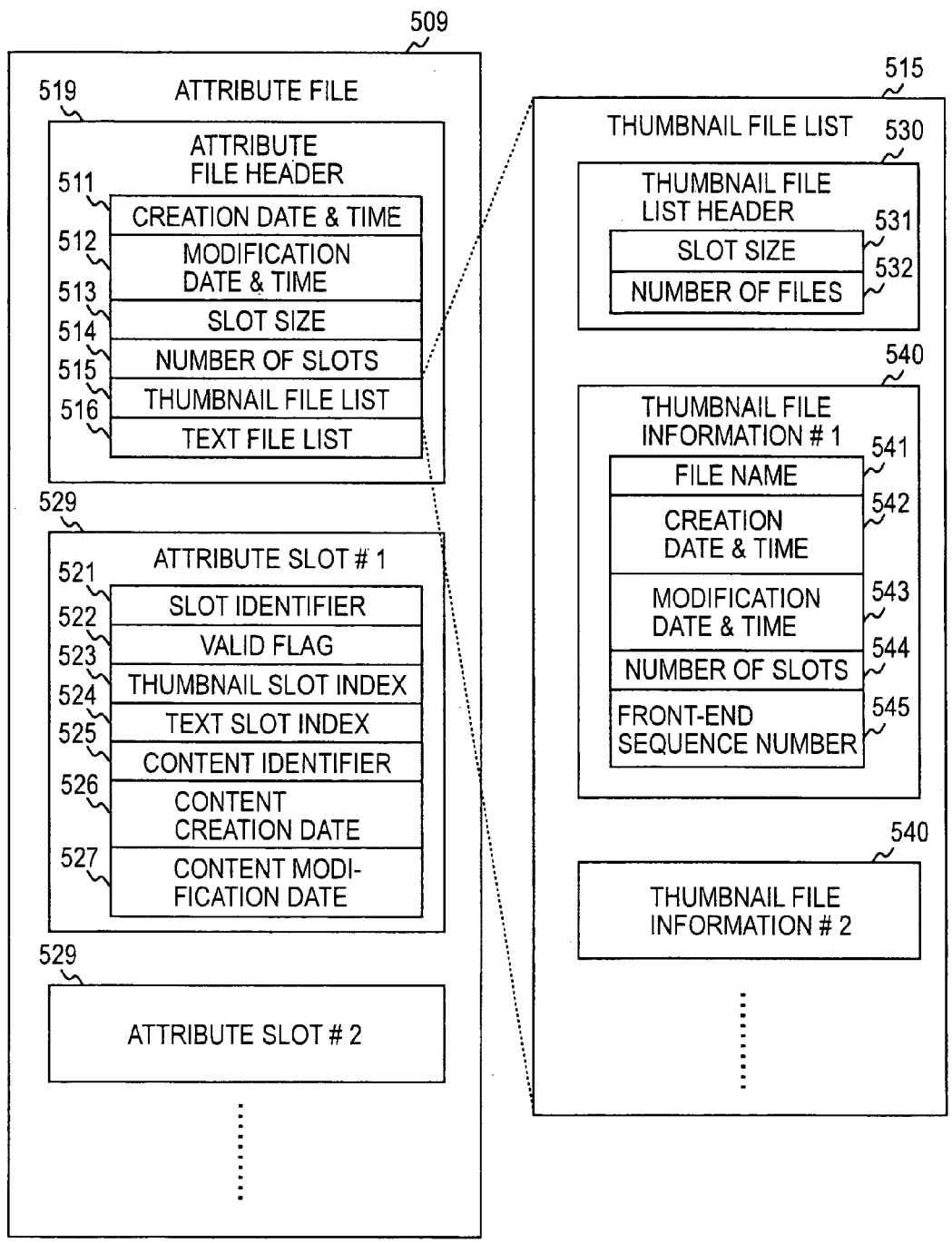
FIG. 13 is a diagram showing a second internal-configuration example of an attribute file 509 in the embodiment of the present invention.

FIG. 13 is a diagram showing a second internal-configuration example of the attribute file 509 in the embodiment of the present invention. Items in the attribute file header 519 and the attribute slot 529 in the attribute slot 509 are similar to those in the example shown in FIG. 6.

However, the thumbnail file lists 515 and the text file lists 516 have the following differences for the presence of multiple files. For example, the thumbnail file list header 530 in the thumbnail file list 515 holds number-of-files 532 indicating the number of thumbnails files. With regard to the thumbnail file information 540, pieces of thumbnail information 540 are provided according to the number of thumbnails.

The thumbnail information 540 holds a front-end sequence number 545. The front-end sequence number 545 indicates, out of all thumbnail files, the order of a first thumbnail file in a corresponding thumbnail file.

While an example of the thumbnail file list 515 has been described above, the text file list 516 holds information regarding the multiple files 700 to 709 in the same manner.

FIG. 14 is a diagram showing an expressing system for slot indices in the attribute file in the embodiment of the present invention. In the attribute file, the thumbnail slot index 523 and the text slot index 524 indicate a thumbnail slot and a text slot, respectively. In particular, when multiple thumbnail files and multiple text files exist as shown in FIG. 12, multiple expressing systems for the slot indices are also possible.

In FIG. 14(*a*), a first thumbnail file contains s thumbnail slots (s is an integer of 1 or greater) and a second thumbnail file contains t thumbnail slots (t is an integer of 1 or greater). In this example, each thumbnail slot is given a slot number that is unique in all the multiple thumbnail files, as a slot index. That is, the slot number of the front-end thumbnail slot in the second thumbnail file is "s+1".

According to the expressing system shown in FIG. 14(*a*), since a slot number that is unique in all the multiple thumbnail files or all the multiple text files, the slot number alone serves as a slot index. In this case, when a slot is identified based on the slot index, checking the front-end sequence number 545 in the thumbnail file information 540 in the case of a thumbnail file can determine in which thumbnail file the corresponding slot exists.

In the same manner as the thumbnail file, a first text file contains n text slots (n is an integer of 1 or greater) and a second text file contains m text slots (m is an integer of 1 or greater). In this example, each text slot is given a slot number that is unique in all the multiple text files, as a slot index. That is, the slot number of the front-end text slot in the second text file is "n+1".

In FIG. 14(*b*), as in the case of FIG. 14(*b*), a first thumbnail file contains s thumbnail slots and a second thumbnail file contains t thumbnail slots.

In this example, however, each thumbnail slot is given a slot number that is unique in the thumbnail file. That is, the thumbnail slots in the first thumbnail file are given file slot numbers "1" to "s" and the thumbnail slots in the second thumbnail file are given slot numbers "1" to "t". Thus, the slot index in this case is constituted by a thumbnail file name and a slot number.

According to the expressing system shown in FIG. 14(*b*), using the thumbnail file name, it is possible to determine in which thumbnail file a corresponding slot exists without checking the front-end sequence number 545 in the thumbnail file information 540.

In the same manner as the thumbnail file, a first text file contains n text slots and a second text file contains m text slots. In this example, each text slot is given a slot number that is unique in the text file. That is, the text slots in the first text file are given slot numbers "1" to "n" and the text slots in the second text file are given slot numbers "1" to "m". Thus, the slot index in this case is constituted by a text file name and a slot number.

FIG. 15 is a diagram showing an example of a functional configuration for recording image information in the embodiment of the present invention. What are shown in this example are a content-identifying section 211, an image-information obtaining section 212, an image-information storing section 213, a medium-type determining section 214, and an image-information recording section 215. The functions of the sections can be achieved by, for example, the processing device 31 or the like in the mobile equipment 100 shown in FIG. 1.

The content-identifying section 211 identifies the title of image data, which serves as content, and a chapter in the title. As illustrated in FIG. 2, the image data of each title is held in the VTSTT_VOBS 423 on the storage medium and the starting position (PTT_SRP) of a chapter in each title is held in the VISI 421. In accordance with content identified by the content-identifying section 211, the image-information obtaining section 212 obtains image information regarding the identified image data from the VTSTT_VOBS 423.

The image-information storing section 213 stores the image information, obtained by the image-information obtaining section 212, in an image information memory 507. For example, the RAM 34 or the like in the mobile equipment 100 shown in FIG. 1 can be used as the image information memory 507.

The medium-type determining section 214 determines the type of a storage medium to which recording is performed. When the storage medium is an optical disk, for example, a writable DVD-RW, DVD+RW, or DVD-RAM, the reflectance is about 18 to 30%, which is a relatively low reflectance. On the other hand, for a DVD-R that is recordable only once (i.e., that is not rewritable), the reflectance is about 45 to 85%, which is a relatively high reflectance. Using such a property, a reference value of, for example, about 30 to 40% (more desirably, 35 to 40%) is set. When the reflectance of a storage medium is larger than the reference value, it is determined that the storage medium is a medium (DVD-R) that is recordable only once, and when the reflectance of a storage medium is smaller than the reference value, it is determined that the storage medium is a rewritable medium (such as a DVD-RW).

The image-information recording section 215 switches between recording systems in accordance with the result of determination performed by the medium-type determining section 214 to record image information, stored in the image information memory 507, in the image-information file group 567 on the storage medium. When it is determined that the storage medium is rewritable, recording is performed in the ROW mode, as shown in FIG. 8, and when it is determined that the storage medium is recordable only once, recording is performed in the INC mode, as shown in FIG. 10.

Figure 16:
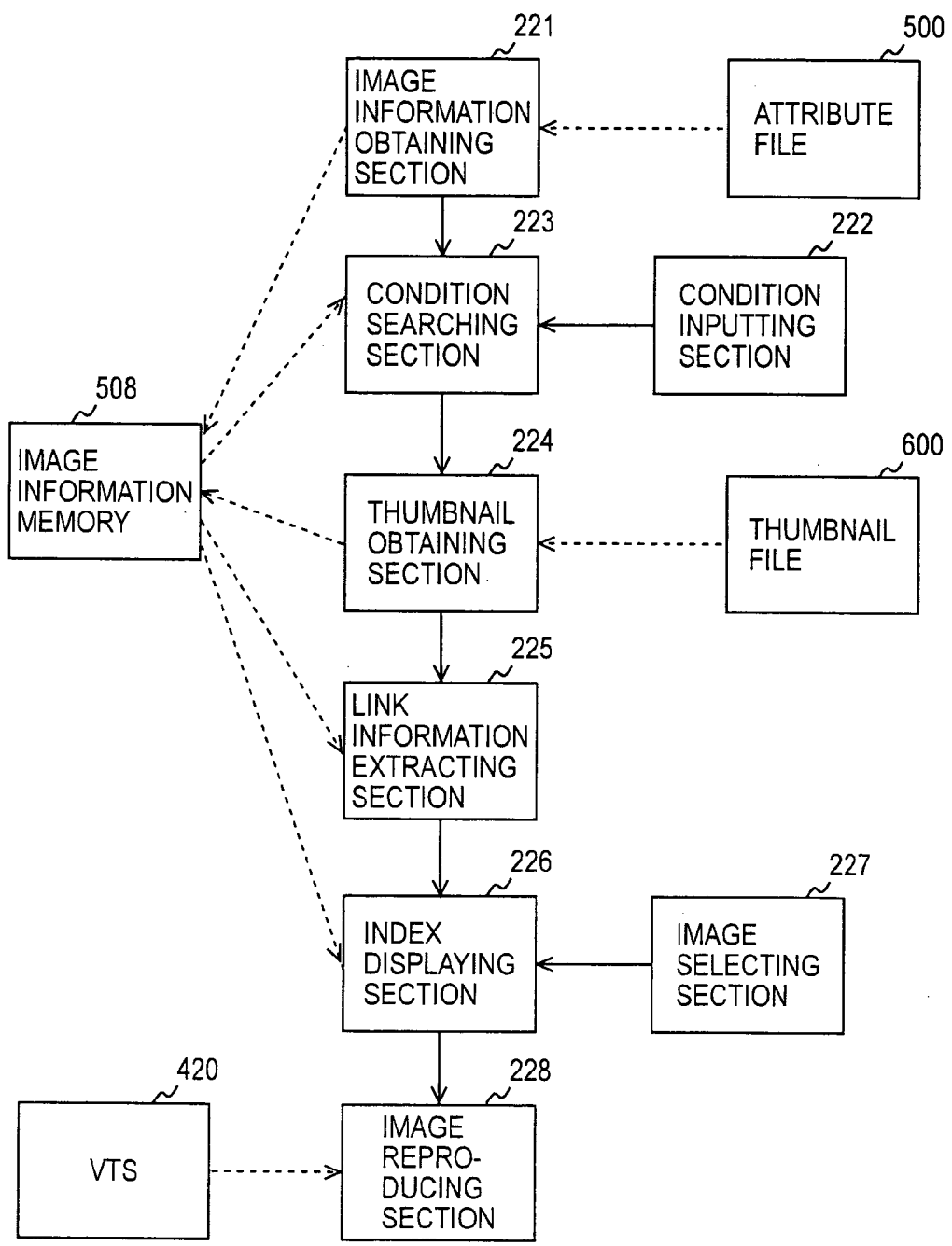
FIG. 16 is a diagram showing an example of a functional configuration for displaying image information in the embodiment of the present invention.

FIG. 16 is a diagram showing an example of a functional configuration for displaying image information in the embodiment of the present invention. What are shown in this example are an attribute-information obtaining section 221, a condition-inputting section 222, a condition-searching section 223, a thumbnail-obtaining section 224, a link-information extracting section 225, an index-displaying section 226, an image-selecting section 227, and an image-reproducing section 228. The functions of the sections can be achieved by the processing device 31 and so on in the mobile equipment 100 shown in FIG. 1.

The attribute-information obtaining section 221 reads content in the attribute file 500 and obtains the attribute of image information regarding image data. The image information regarding the obtained attribute is held in an image information memory 508. For example, the RAM 34 or the like in the mobile equipment 100 shown in FIG. 1 can be used as the image information memory 508, in the same manner as the image information memory 507.

The condition-inputting section 222 prompts, on the displaying section 42 (FIG. 1) or the like, the user to enter a search condition for an image-information attribute and receives an input from the user through the operation-inputting section 41 (FIG. 1). In accordance with a search condition input from the condition-inputting section 222, the condition-searching section 223 searches the image-information attributes held in the image information memory 508. As the search condition, for example, the order of photography date and time can be used.

In accordance with the result of the searching performed by the condition-searching section 223, the thumbnail-obtaining section 224 obtains corresponding thumbnails from the thumbnail file 600. The obtained thumbnails are held in the image information memory 508.

The link-information extracting section 225 extracts link information indicating the relationships between the thumbnails and the image data. The link information indicates, in attribute slots held in the image information memory 508, the relationships between thumbnails indicated by the thumbnail slot indices 523 and corresponding data indicated by the content identifiers 525.

The index-displaying section 226 obtains the thumbnails, obtained in accordance with the result of searching performed by the condition-searching section 223, from the image information memory 508 and displays a list of the thumbnails. The image-selecting section 227 receives an input of a selected thumbnail of the thumbnail list displayed by the index-displaying section 226. Based on the link information, the image-reproducing section 228 identifies image data associated with the selected thumbnail, reads the image data from the VTS 420, and reproduces the image data.

FIG. 17 is a view showing an example of thumbnails displayed by the index-displaying section 226 in the embodiment of the present invention. The index-displaying section 226 displays thumbnails 311 in an aligned manner, as shown in FIG. 17(a). By selecting an arbitrary thumbnail on the screen, the user can reproduce corresponding image data. When the thumbnails cannot be displayed on one page, pressing a previous-page button 312 or a next-page button 313 allows another page to be displayed.

The display sequence on the display screen can be set by a search condition specified by the user. The search condition can be, for example, the order of photography date and time or the like, and in this case, display can be performed in accordance with the content creation date 526 in a corresponding attribute slot 520. Including user information, such as photography position information, in the attribute slot 520 allows display to be performed based on arbitrary user information.

The user can also delete a corresponding content on the display screen. In this case, the valid flag 522 (FIG. 6) in a corresponding attribute slot 520 is disabled, but the attribute slot 520, the thumbnail slot 620, and the text slot 720 are not deleted. If those slots are deleted, a need for updating the thumbnail slot 523 and the text slot index 524 in another attribute slot arises, thus requiring more time for processing. In particular, when the slot indices are managed by sequence numbers, as shown in FIG. 14(a), the load can increase. Thus, the valid flag 522 is used to determine the validity of each thumbnail or the like, and for example, only a necessary thumbnail is displayed, as shown in FIG. 14(a). The attribute slot for which the valid flag 522 is disabled is temporarily left unchanged in the area, and when new content is recorded, new date is written to the invalidated attribute slot, so that the attribute slot is reused. Since the attribute slot has a fixed length, it can be reused. Thus, efficient file management is achieved without wasting areas.

Text information can be attached to each thumbnail. In the example shown in FIG. 17(a), text information (e.g., "text #1") is displayed under each thumbnail. The text information is held in a corresponding text slot 720 in the text file 700. The user can enter new text information and can also make a change, as needed.

FIG. 17(b) shows an example of display of a text-information input screen. In this example, a text box 323 is for prompting the input of text information is displayed beside a thumbnail 321. Through inputting to the text box 323, the user can set text information.

In this case, information associated with the thumbnail 321 may be displayed at the same time. For example, in this example, information 322 indicating photography date and time is displayed. The photography date, indicated by the information 322, can be obtained from the content creation date 526 in a corresponding attribute slot 520.

The text-information input screen may be displayed in response to a predetermined action, such as right click or double click, with respect to a corresponding thumbnail shown in FIG. 17(a).

Next, the operations of an image-information recording device and an image-information display device according to the embodiment of the present invention will be described with reference to drawings.

Figure 18:
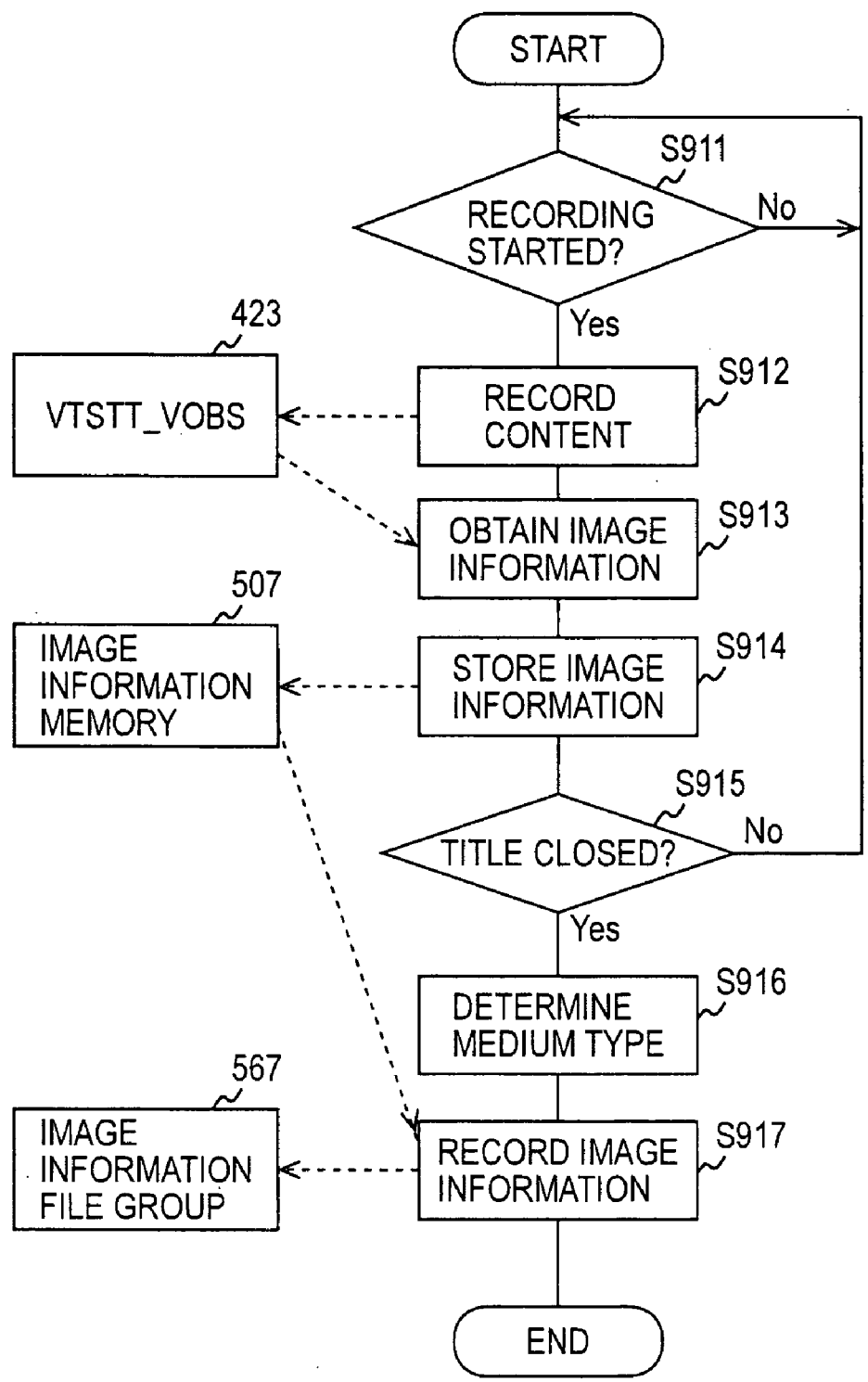
FIG. 18 is a diagram showing one example of a processing procedure for recording image information in the embodiment of the present invention.

FIG. 18 is a diagram showing one example of a processing procedure for recording image information in the embodiment of the present invention. When an instruction for the start of recording is given in the standby state (step S911), image data is recorded, as content, at a predetermined position of the VTSTT_VOBS 423 on the storage medium (step S912). The recording position on the storage medium is uniquely identified with a title and a chapter.

In parallel with or subsequent to the recording of the image data, image information is obtained from the VTSTT_VOBS 423 (step S913). For example, thumbnails correspond to the image information. The obtained image information is stored in the image information memory 507 (step S914).

When the record stop button or the like is pressed to stop the recording and the recording of next content is waited for without closing a title (step S915), the operation returns to the standby state again. On the other hand, when a title for which recording has been performed is closed, the type of the storage medium is determined (step S916) and image information is recorded in the image-information file group 567 by a recording system according to the result of the determination (step S917).

Figure 19:
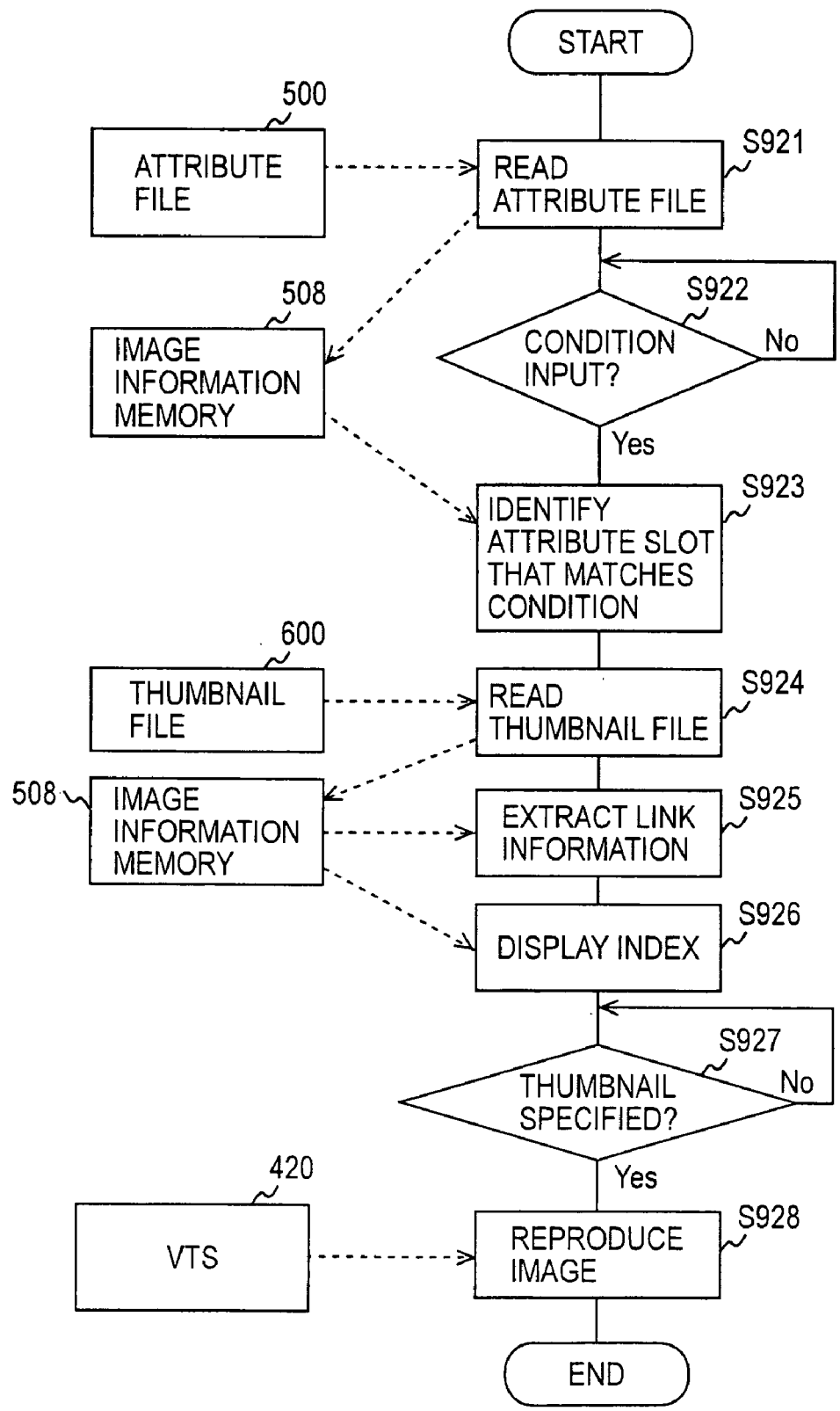
FIG. 19 is a diagram showing one example of a processing procedure for displaying image information in the embodiment of the present invention.

FIG. 19 is a diagram showing one example of a processing procedure for displaying image information in the embodiment of the present invention. Prior to the display of image information, for example, when the image-information display device is powered on, the attribute file 500 is read out to the image information memory 508 (step S921).

The user inputs a condition for displaying the image information (step S922). Then, of the attribute slots held in the image information memory 508, attribute slots that satisfy the input condition are identified (step S923). Thumbnails associated with the identified attribute slots are read out from the thumbnail file 600 to the image information memory 508 (step S924).

In the attribute slots held in the image information memory 508, the relationships between thumbnails indicated by the thumbnail slot indices 523 and corresponding image data indicated by the content identifiers 525 are extracted as link information (step S925).

A list of the thumbnails held in the image information memory 508 is displayed (step S926). In this case, when an input selection for specifying any of the thumbnails in the displayed thumbnail list is received (step S927), image data associated with the selected thumbnail is identified based on the link information and the identified image data is read from the VTS 420 and is reproduced (step S928).

In this manner, according to the embodiment of the present invention, image information for each chapter is held in the thumbnail slot 620 and the text slot 720 and searching is performed according to a search condition sent from the condition-inputting section 222. Consequently, image information can be efficiently displayed.

Figure 20:
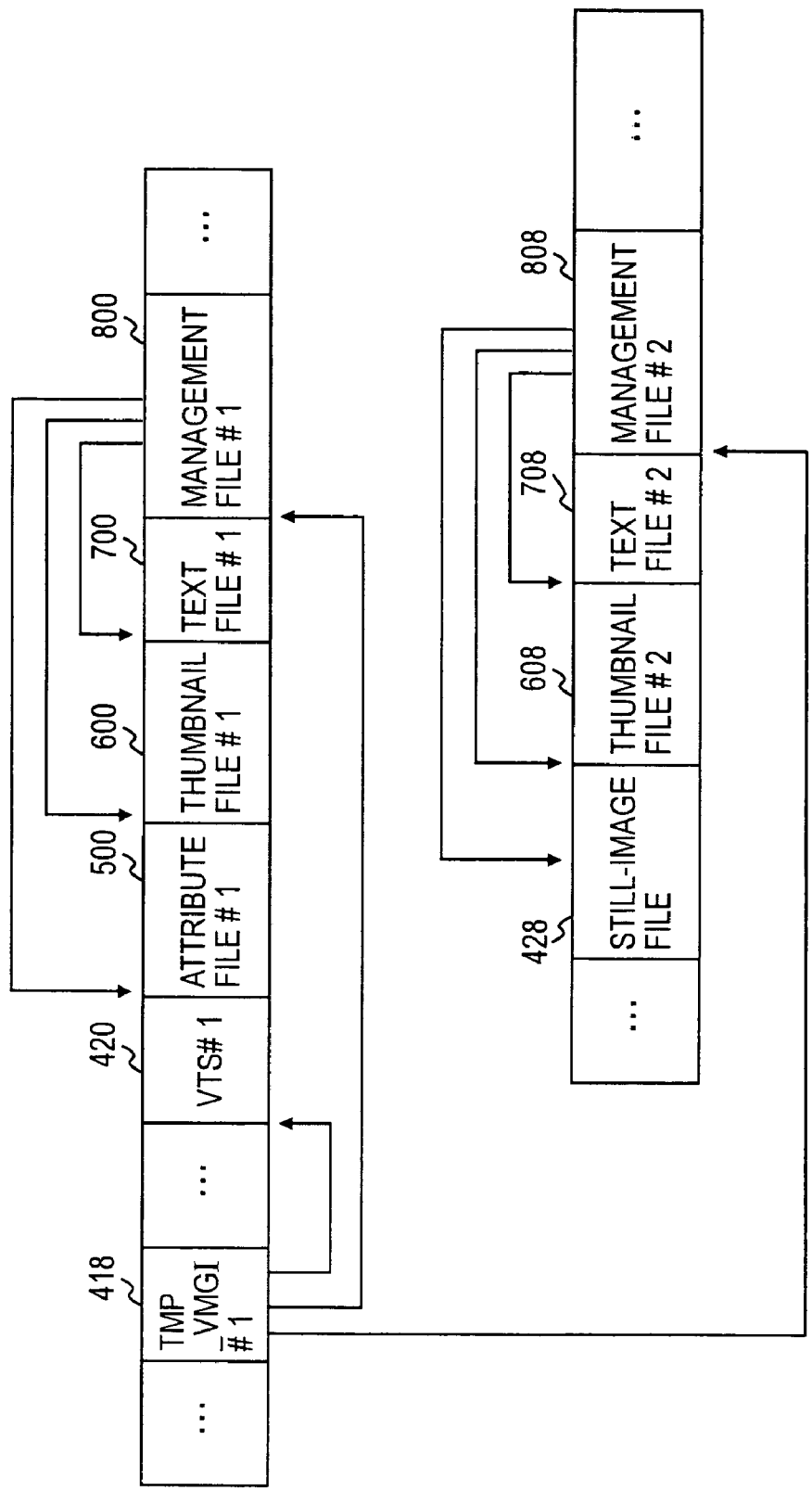
FIG. 20 is a diagram showing one example of a state in which moving-image data and still images are recorded in the image-information file group in the embodiment of the present invention.

In the embodiment of the present invention, although image data contained in a video title set has been described as moving-image data, the image data may be still images. For example, as shown in FIG. 20, the arrangement may be such that moving-image data is recorded in the VTS 420 and still images may be recorded in a still-image file 428. Image information regarding moving-image data is recorded in the attribute file #1 (500), the thumbnail file #1 (600), and the text file #1 (700), which are managed by the management file #1 (800). In this case, image information regarding still images is recorded in a thumbnail file #2 (608) and a text file #2 (708), which are managed by a management file #2 (808). In this case, as an attribute file, the attribute file #1 (500) is used for both moving-image data and still-image data.

That is, when both moving-image data and still images are managed on one storage medium, thumbnail files and so on are discretely recorded as in the case shown in FIG. 11. When multiple thumbnail files and so on exit in such a manner, the thumbnail files and so on are referred to from one attribute file 509, as shown in FIG. 12.

The provision of such multiple thumbnail files and multiple text files allows high-speed switching between a menu display screen for moving images and a menu display screen for still images. When a thumbnail file containing still-image thumbnails and an attribute file are transmitted to a printer having a function for printing thumbnails through direct connection with a camera, it is inconvenient unless moving-image data thumbnails and still-image thumbnails are separated. Thus, providing multiple thumbnails files and separating thumbnails into moving-image data thumbnails and still-image thumbnails facilitate the printing of the thumbnails. In addition, when the thumbnails are selectively printed, it is possible to utilize the active flag 522 in each attribute slot in the attribute file.

In this manner, when multiple thumbnail files and text files are permitted to exist in the image-information file group, both moving-image data and still images can be conveniently managed on one storage medium regardless of the recording system.

Figure 21:
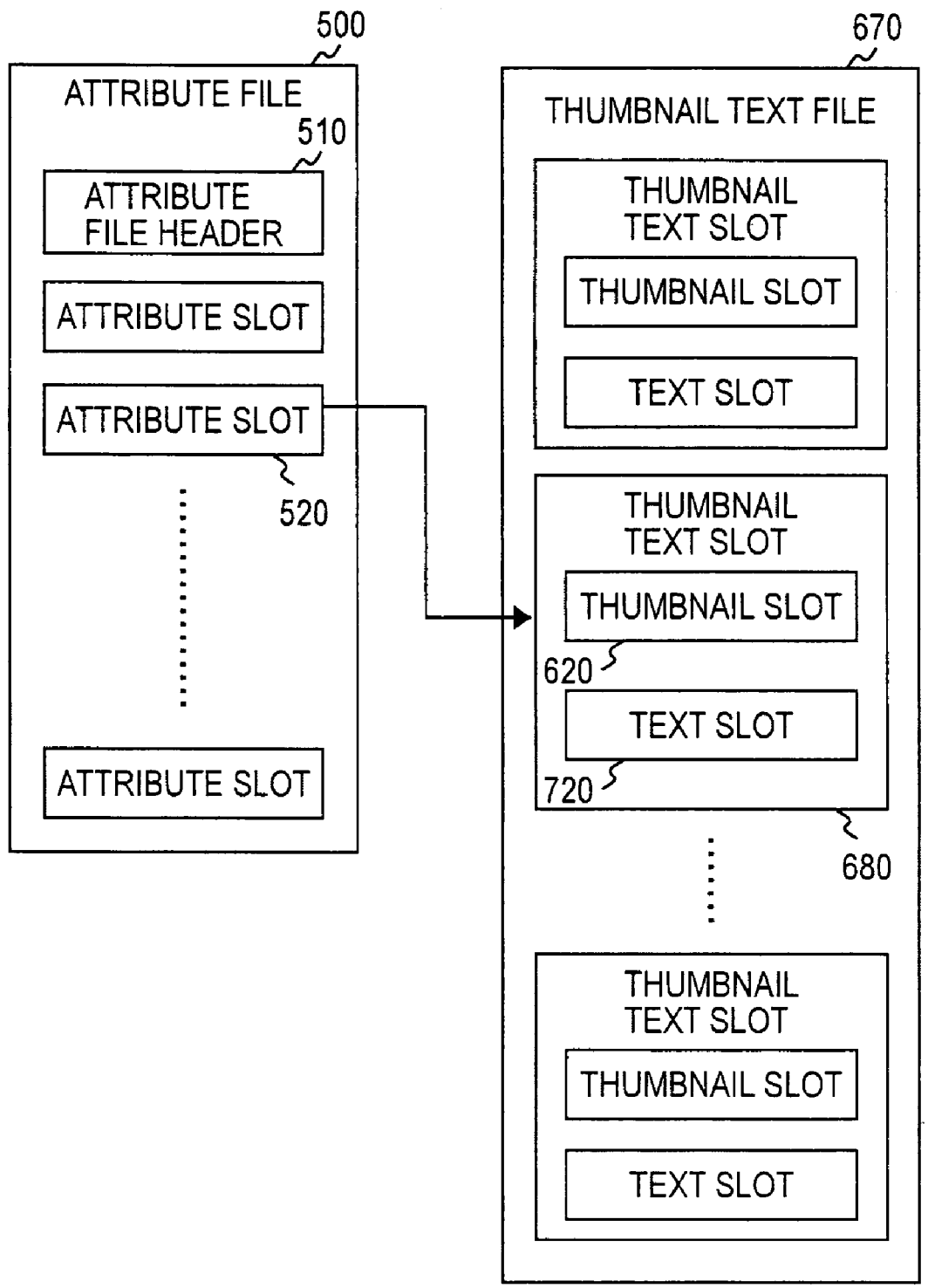
FIG. 21 is a diagram showing a third configuration example of the image-information file group in the embodiment of the present invention.

Although the thumbnails slots and text slots have been described as being held in separate files in the embodiment of the present invention, they may be provided in a common file. For example, as shown in FIG. 21, the arrangement may be such that the thumbnail slot 620 and the text slot 720 are provided in a thumbnail text slot 680 and at least one thumbnail text slot 680 is held in a thumbnail text file 670. In this case, as needed, the attribute slot 520 refers to the thumbnail slot 620 or the text slot 720 in the thumbnail text file 670.

The embodiment of the present invention has been described as one example for embodying the present invention. While features in the claims have association relationships as described below, the present invention is not limited thereto and various modifications can be made without departing from the scope of the present invention.

Image data units correspond to, for example, chapters. An image data unit group corresponds to, for example, a title. Image data identifying means corresponds to, for example, the content-identifying section 211. Image-information obtaining means corresponds to, for example, the image-information obtaining section 212. Image-information recording means corresponds to, for example, the image-information recording section 215. Image information data corresponds to, for example, the image-information file group 567.

Image data units corresponds to, for example, chapters. An image data unit group corresponds to, for example, a title. Image data identifying means corresponds to, for example, the content-identifying section 211. Image-information obtaining means corresponds to, for example, the image-information obtaining section 212. Image-information recording means corresponds to, for example, the image-information recording section 215. An image-information file group corresponds to, for example, the image-information file group 567.

An image information memory corresponds to, for example, the image information memory 507. Image-information storing means corresponds to, for example, the image-information storing section 213.

A representative image file corresponds to, for example, the thumbnail file 600.

Image data units corresponds to, for example, chapters. An image data unit group corresponds to, for example, a title. Attribute obtaining means corresponds to, for example, the attribute-information obtaining section 221. Condition inputting means corresponds to, for example, the condition-inputting section 222. Condition searching means corresponds to, for example, the condition-searching section 223. Representative-image obtaining means corresponds to, for example, the thumbnail obtaining section 224. Displaying means corresponds to, for example, the index-displaying section 226. Image information data corresponds to, for example, the image-information file group 567.

Image data units correspond to, for example, chapters. An image data unit group corresponds to, for example, a title. Attribute obtaining means corresponds to, for example, the attribute-information obtaining section 221. Condition inputting means corresponds to, for example, the condition-inputting section 222. Condition searching means corresponds to, for example, the condition-searching section 223. Representative-image obtaining means corresponds to, for example, the thumbnail obtaining section 224. Displaying means corresponds to, for example, the index-displaying section 226. An image-information file group corresponds to, for example, the image-information file group 567.

An image information memory corresponds to, for example, the image information memory 508.

Link-information extracting means corresponds to, for example, the link-information extracting section 225. Image selecting means corresponds to, for example, the image-selecting section 227. Image reproducing means corresponds to, for example, the image-reproducing section 228.

An image information memory corresponds to, for example, the image information memory 507. Image data units correspond to, for example, chapters. An image data unit group corresponds to, for example, a title. Means for performing recording to a storage medium corresponds to, for example, the image-information recording means 215. An image-information file group corresponds to, for example, the image-information file group 567. A step for identifying image data based on predetermined image data units and an image data unit group including the image data units corresponds to, for example, step S912. A step of obtaining image information regarding the image data from the identified image data of the image data unit corresponds to, for example, step S913. A step of storing the obtained image information in the image information memory corresponds to, for example, step S914. A step of recording, as an image information file group, image information in the image information stored in the image information memory onto the storage medium for each image data unit corresponds to, for example, step S917.

An image information memory corresponds to, for example, the image information memory 508. Image data units correspond to, for example, chapters. An image data unit group corresponds to, for example, a title. A step of obtaining, with respect to image data identified with predetermined image data units and an image data unit group including the image data units, attributes of image information for the image data from an image-information file group in which the image information is recorded on a storage medium for each image data unit and of holding the attributes in the image information memory corresponds to, for example, step S921. A step of prompting input of a search condition regarding an attribute of the image information and receiving the input corresponds to, for example, step S922. A step of searching the attributes held in the image information memory in accordance with the input search condition corresponds to, for example, step S923. A step of obtaining representative images of the image data for the respective image data units from the image-information file group in accordance with a result of the searching and of holding the representative images in the image information memory corresponds to, for example, step S924. A step of displaying a list of the representative images for the respective image data units, the representative images being held in the image information memory corresponds to, for example, step S926.

The processing procedures described in the embodiment of the present invention may be regards as a method having the series of procedures or may be regarded as a program causing a computer to execute the series of procedures or a storage medium for storing the program.

INDUSTRIAL APPLICABILITY

As an example of use of the present invention, the present invention is applicable to, for example, a case in which image information regarding image data on a storage medium is recorded or displayed.

The present invention can provide a superior advantage in that image information regarding image data recorded on a storage medium is searched based on a desired search condition and is efficiently displayed.

The invention claimed is:

1. An image-information recording device comprising:
   an image-information obtaining section configured to obtain image information data from a storage medium, said image information data including an image-information file group and a management file;
   an image-information storing section configured to store said image information data within image information memory, said image information data stored in said image information memory being obtained image information data;
   an image-information recording section configured to record said obtained image information data, said obtained image information data being recorded onto said storage medium upon closure of a title.

2. The image-information recording device according to claim 1, wherein image data is recorded onto said storage medium.

3. The image-information recording device according to claim 2, wherein an image data unit of said image data is represented by a thumbnail, said thumbnail being an I picture in a front-end VOBU.

4. The image-information recording device according to claim 2, wherein said image data is identifiable by a recording position on said storage medium, said recording position being said title of the image data and a chapter in the title.

5. The image-information recording device according to claim 2, wherein said image-information file group includes an attribute file, a thumbnail file, and a text file.

6. The image-information display device according to claim 5, wherein said management file includes a starting address and a size for said attribute file, said thumbnail file, and said text file.

7. The image-information recording device according to claim 1, further comprising:
   a medium-type determining section configured to determine a memory type of said storage medium, recording systems for recording said image information being switchable upon a determination of said memory type.

8. The image-information recording device according to claim 7, wherein said memory type is determined upon said closure of the title.

9. The image-information recording device according to claim 7, wherein a reflectance of said storage medium is measured, said reflectance being used to determine said memory type.

10. An image-information recording method comprising the steps of:
    obtaining image information data from a storage medium, said image information data including an image-information file group and a management file;
    storing said image information data within image information memory, said image information data stored in said image information memory being obtained image information data;
    recording said obtained image information data, said obtained image information data being recorded onto said storage medium upon closure of a title.

11. The image-information recording method according to claim 10, further comprising:
    recording image data onto said storage medium.

12. The image-information recording method according to claim 11, further comprising:
    identifying said image data by a recording position on said storage medium, said recording position being said title of the image data and a chapter in the title.

13. The image-information recording method according to claim 10, further comprising:
    determining a memory type of said storage medium, recording systems for recording said image information being switchable upon a determination of said memory type.

14. The image-information recording method according to claim 13, wherein said memory type is determined upon said closure of the title.

15. The image-information recording method according to claim 13, further comprising:
    measuring a reflectance of said storage medium, said reflectance being used to determine said memory type.

16. A computer program embodied in a tangible non-transitory computer readable medium, the computer program being configured to perform the method of claim 10.

* * * * *